United States Patent
Sato et al.

(10) Patent No.: US 9,630,152 B2
(45) Date of Patent: Apr. 25, 2017

(54) POLYKETONE POROUS FILM

(75) Inventors: Daisuke Sato, Tokyo (JP); Masayuki Kaneda, Tokyo (JP); Takashi Komatsu, Tokyo (JP)

(73) Assignee: ASAHI KASEI FIBERS CORPORATION, Osaka (JP)

(*) Notice: Subject to any disclaimer, the term of this patent is extended or adjusted under 35 U.S.C. 154(b) by 195 days.

(21) Appl. No.: 14/343,216

(22) PCT Filed: Sep. 5, 2012

(86) PCT No.: PCT/JP2012/072632
§ 371 (c)(1),
(2), (4) Date: Mar. 6, 2014

(87) PCT Pub. No.: WO2013/035747
PCT Pub. Date: Mar. 14, 2013

(65) Prior Publication Data
US 2014/0217013 A1 Aug. 7, 2014

(30) Foreign Application Priority Data
Sep. 9, 2011 (JP) .................................. 2011-197200

(51) Int. Cl.
*B01D 39/00* (2006.01)
*B01D 39/14* (2006.01)
(Continued)

(52) U.S. Cl.
CPC ............ *B01D 71/72* (2013.01); *B01D 69/02* (2013.01); *B01D 71/38* (2013.01); *C08J 9/283* (2013.01);
(Continued)

(58) Field of Classification Search
CPC . B29C 66/03242; B29C 66/727; B01D 69/12; B01D 61/147; B01D 71/06; B01D 71/26
See application file for complete search history.

(56) References Cited

U.S. PATENT DOCUMENTS 4,721,732 A * 1/1988 Dubrow ............... B29C 61/003
210/500.21
4,804,472 A * 2/1989 Handlin, Jr. .......... B01D 71/72
210/500.27
(Continued)

FOREIGN PATENT DOCUMENTS

EP 2 027 911 A1 2/2009
JP 02-4431 1/1990
(Continued)

OTHER PUBLICATIONS

Supplemental European Search Report from the European Patent Office for EP Patent Application No. 12829681.1, dated Mar. 12, 2015.
(Continued)

*Primary Examiner* — Ana Fortuna
(74) *Attorney, Agent, or Firm* — Finnegan, Henderson, Farabow, Garrett & Dunner, LLP

(57) ABSTRACT

To provide a polyketone porous film having heat resistance and chemical resistance and useful as a filter for filtration having a high particle collection efficiency and as a battery or capacitor separator having a low permeation resistance to ion and the like.

A polyketone porous film comprising from 10 to 100 mass % of a polyketone as a copolymer of carbon monoxide and one or more olefins, wherein the polyketone porous film has a pore formed only by a polyketone, the pore diameter uniformity parameter as a value obtained by dividing the standard deviation of the pore diameter in the pore by an average pore diameter is from 0 to 1.0, and the average through hole diameter of the polyketone porous film is from 0.01 to 50 μm.

21 Claims, 4 Drawing Sheets

(51) Int. Cl.
  *B01D 63/00* (2006.01)
  *H01G 9/00* (2006.01)
  *B01D 71/72* (2006.01)
  *H01M 2/16* (2006.01)
  *B01D 69/02* (2006.01)
  *B01D 71/38* (2006.01)
  *H01G 9/02* (2006.01)
  *H01G 11/52* (2013.01)
  *C08J 9/28* (2006.01)
  *H01M 2/14* (2006.01)
  *B01D 61/14* (2006.01)

(52) U.S. Cl.
  CPC .............. *H01G 9/02* (2013.01); *H01G 11/52* (2013.01); *H01M 2/145* (2013.01); *H01M 2/1653* (2013.01); *B01D 61/147* (2013.01); *B01D 2325/02* (2013.01); *B01D 2325/021* (2013.01); *B01D 2325/22* (2013.01); *B01D 2325/30* (2013.01); *C08J 2373/00* (2013.01); *Y02E 60/13* (2013.01); *Y10T 428/2975* (2015.01); *Y10T 442/626* (2015.04); *Y10T 442/678* (2015.04)

(56) References Cited

U.S. PATENT DOCUMENTS

| | | | | |
|---|---|---|---|---|
| 4,897,305 A * | 1/1990 | Ho | B05D 1/62 | 427/491 |
| 4,992,485 A * | 2/1991 | Koo | B01D 71/52 | 428/159 |
| 5,205,968 A * | 4/1993 | Damrow | B01D 67/0009 | 210/500.27 |
| 5,232,968 A * | 8/1993 | Davidson | C08K 5/0091 | 524/114 |
| 5,279,739 A * | 1/1994 | Pemawansa | B01D 67/0011 | 210/490 |
| 5,714,578 A * | 2/1998 | Yoshimura | C07K 14/523 | 530/324 |
| 5,997,741 A * | 12/1999 | Shimoda | B01D 67/0011 | 210/500.27 |
| 2005/0060688 A1* | 3/2005 | Kamalakantha | G06F 8/73 | 717/123 |
| 2005/0244639 A1* | 11/2005 | Marin | D01D 5/11 | 428/364 |
| 2006/0135738 A1 | 6/2006 | Taniguchi et al. | | |
| 2007/0056901 A1* | 3/2007 | Wang | B01D 67/0011 | 210/500.39 |
| 2010/0151311 A1 | 6/2010 | Usami et al. | | |
| 2010/0252426 A1 | 10/2010 | Tsukuda et al. | | |
| 2014/0217013 A1* | 8/2014 | Sato | B01D 71/38 | 210/500.27 |

FOREIGN PATENT DOCUMENTS

| | | |
|---|---|---|
| JP | 2002-348401 | 12/2002 |
| JP | 2004-267833 | 9/2004 |
| JP | 2005-179443 | 7/2005 |
| JP | 2005-179443 A | 7/2005 |
| JP | 2009-286820 | 12/2009 |
| JP | 2012-45815 | 3/2012 |
| JP | 2012-167209 | 9/2012 |
| KR | 10-2009-0096754 | 9/2009 |
| WO | WO 03/055934 | 7/2003 |
| WO | WO 2010/033027 | 3/2010 |

OTHER PUBLICATIONS

International Search Report from the Japanese Patent Office for International Application No. PCT/JP2012/072632, mailing date Dec. 4, 2012.

Office Action fo CN Application No. 201280043773.7 dated Sep. 30, 2014.

* cited by examiner

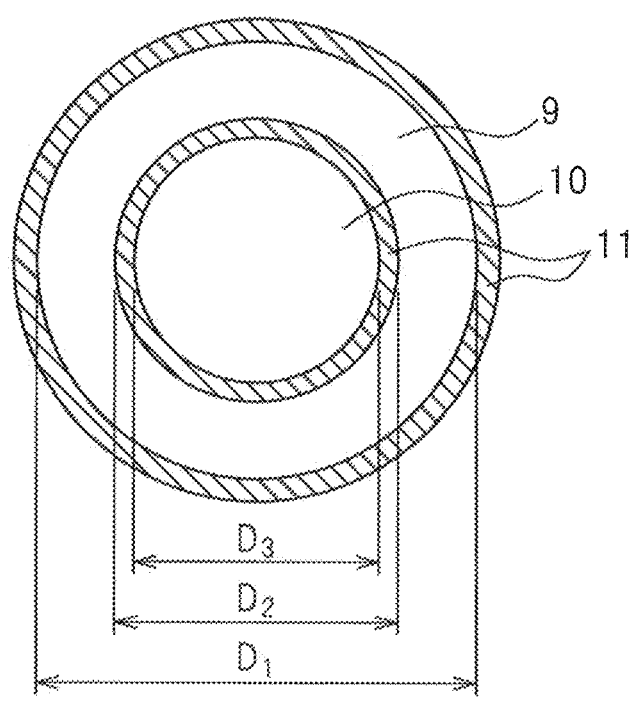

ered to as polyketone) obtained by polymerizing carbon monoxide and an olefin by using palladium or nickel as a catalyst, where the carbon monoxide and the olefin are completely alternating copolymerized, is known. Due to its high crystallinity, the polyketone when formed into a fiber or a film exhibits characteristics such as high mechanical property, high melting point, organic solvent resistance and chemical resistance. Above all, when the olefin is ethylene, the melting point of the polyketone is 240° C. or more. Such a polyketone is excellent in the heat resistance as compared with, for example, polyethylene. Accordingly, a polyketone porous film obtained by processing the polyketone into a porous film also has heat resistance and chemical resistance. Furthermore, because the polyketone has affinity for water and various organic solvents and also, the carbon monoxide and ethylene as raw materials are relatively inexpensive, making it possible to lower the cost of polymer of the polyketone, the polyketone porous film is expected to find its utilization in industry as a filter medium. In addition, when the polyketone porous film is flat film-shaped, the porous film can also be used as a separator capable of solving the above-described problems of a lithium ion secondary battery and various capacitors and therefore, is more useful.

POLYKETONE POROUS FILM

TECHNICAL FIELD

The present invention relates to a polyketone porous film and its usage.

BACKGROUND ART

A porous film having fine through holes is used as a filter medium for microfiltration so as to filter impure particles in a liquid or a gas in various fields such as medical, semiconductor manufacturing and food industry fields. In the case where the gas or liquid treated is an organic solvent, some filters may exhibit corrosivity to the organic solvent or may be used in a high-temperature environment. In such a case, chemical resistance, chemical stability, heat resistance and the like are often required of the filter. As a material meeting this requirement, a porous film formed of a fluorine-based resin has been developed. However, the fluorine-based resin is expensive and furthermore, highly hydrophobic and therefore, there is a problem that in the case of filtering an aqueous treating solution, a hydrophilization treatment must be previously applied to the fluorine-based resin-made filter medium or the filter medium must be immersed in an alcohol before use.

On the other hand, a porous film is also being used as a separator that is a constituent member for preventing contact between an anode and a cathode in a lithium ion secondary battery, an electrical double layer capacitor, an electrolytic capacity and the like. Recently, in view of safety and product life, the requirement for heat resistance of the separator is increasing. As for the separator of a lithium ion secondary battery used at present, a porous film made of polyethylene or polypropylene is being predominantly employed. However, the polyethylene and polypropylene are poor in the heat resistance, and there may be a possible risk that a separator using such a resin is melted/softened at a high temperature and shrinks to put the anode and the cathode into contact and cause a short circuit. In an electrical double layer capacitor and an electrolytic capacitor, paper formed of a cellulose material is being predominantly used. However, in this case, an electrolytic solution developed for a high temperature-resistant application, where an ion liquid such as 1-ethyl-3-methylimidazolium tetrafluoroboric acid is dissolved as an electrolyte in a solvent such as γ-butyrolactone, decomposes or dissolves the cellulose at a high temperature, giving rise to a problem that the life of the product is short.

An aliphatic polyketone (hereinafter, sometimes referred to as polyketone) obtained by polymerizing carbon monoxide and an olefin by using palladium or nickel as a catalyst, where the carbon monoxide and the olefin are completely alternating copolymerized, is known. Due to its high crystallinity, the polyketone when formed into a fiber or a film exhibits characteristics such as high mechanical property, high melting point, organic solvent resistance and chemical resistance. Above all, when the olefin is ethylene, the melting point of the polyketone is 240° C. or more. Such a polyketone is excellent in the heat resistance as compared with, for example, polyethylene. Accordingly, a polyketone porous film obtained by processing the polyketone into a porous film also has heat resistance and chemical resistance. Furthermore, because the polyketone has affinity for water and various organic solvents and also, the carbon monoxide and ethylene as raw materials are relatively inexpensive, making it possible to lower the cost of polymer of the polyketone, the polyketone porous film is expected to find its utilization in industry as a filter medium. In addition, when the polyketone porous film is flat film-shaped, the porous film can also be used as a separator capable of solving the above-described problems of a lithium ion secondary battery and various capacitors and therefore, is more useful.

Usefulness of the polyketone porous film as a filter medium is described, for example, in Patent Document 1 and Patent Document 2.

RELATED ART

Patent Document

Patent Document 1: Kokai (Japanese Unexamined Patent Publication) No. 2-4431
Patent Document 2: Kokai No. 2002-348401

SUMMARY OF THE INVENTION

Problems to be Solved by the Invention

The polyketone porous film described in Patent Document 1 is produced by wet film formation using hexafluoroisopropanol as a solvent and water or isopropanol as a non-solvent. In the porous film obtained by this method, a very dense layer is formed near the surface, and the pore diameter is non-uniform in the thickness direction. Furthermore, the polyketone porous film described in Patent Document 2 is produced by wet film formation using, as a solvent, a thick aqueous solution of metal salt. Also in the polyketone porous film obtained by this method, a dense layer is formed near the surface, and the pore diameter is non-uniform in the thickness direction.

In the case of using a porous film as a filter medium, the non-uniformity of the pore diameter of the porous film causes reduction in the particle collection efficiency for the differential pressure. Also, in the battery or capacitor application, the non-uniformity of the pore diameter of the separator gives rise to a large permeation resistance to ion or the like, leading to a large internal resistance of the battery or capacitor. Furthermore, in Patent Document 2, a zinc salt or a calcium salt is used as the solvent and it is difficult to completely eliminate the residual metal from the polyketone porous film after film formation, washing and drying. Accordingly, the polyketone porous film described in Patent Document 2 is improper as a filter medium in the field disliking a metal impurity and as a separator for a battery or a capacitor. A polyketone porous film having a uniform pore diameter in the thickness direction has not been developed so far.

The problem to be solved by the present invention is to provide a polyketone porous film having heat resistance and chemical resistance and useful in applications such as a filter for filtration having a high particle collection efficiency and a battery or capacitor separator having a low permeation resistance to ion and the like.

Means to Solve the Problems

As a result of many intensive studies to solve the problem above, the present inventors have found that the above-described problem can be solved by a polyketone porous film having a uniform pore diameter in the thickness direction. The present invention has been accomplished based on this finding. Specifically, the present invention has the following embodiments.

[1] A polyketone porous film comprising from 10 to 100 mass % of a polyketone as a copolymer of carbon monoxide and one or more olefins, wherein:

the polyketone porous film has a pore formed only by a polyketone, the pore diameter uniformity parameter as a value obtained by dividing the standard deviation of the pore diameter in the pore by an average pore diameter is from 0 to 1.0, and the average through hole diameter of the polyketone porous film is from 0.01 to 50 μm.

[2] The polyketone porous film according to [1] above, wherein the porosity of the polyketone porous film is from 5 to 95%.

[3] The polyketone porous film according to [1] or [2] above, wherein the polyketone contains a repeating unit represented by the following chemical formula (1):

[Chem. 1]

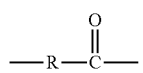
(1)

{wherein R is a substituted or unsubstituted hydrocarbon group having a carbon number of 2 to 20}.

[4] The polyketone porous film according to any one of [1] to [3] above, wherein the ratio of a 1-oxotrimethylene repeating unit represented by the following chemical formula (2) relative to repeating units constituting the polyketone is 70 mol % or more:

[Chem. 2]

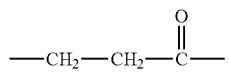
(2)

[5] The polyketone porous film according to [3] or [4] above, wherein the polyketone contains a repeating unit represented by the following chemical formula (1):

[Chem. 3]

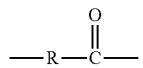
(1)

{wherein R is a substituted or unsubstituted hydrocarbon group having a carbon number of 2 to 20} and R contains one or more members selected from the group consisting of a hydrogen atom, a halogen atom, a hydroxyl group, an ether group, a primary amino group, a secondary amino group, a tertiary amino group, a quaternary ammonium group, a sulfonic acid group, a sulfonic acid ester group, a carboxylic acid group, a carboxylic acid ester group, a phosphoric acid group, a phosphoric acid ester group, a thiol group, a sulfide group, an alkoxysilyl group and a silanol group.

[6] The polyketone porous film according to any one of [3] to [5] above, wherein the polyketone contains a repeating unit represented by the following chemical formula (1):

[Chem. 4]

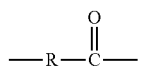
(1)

{wherein R is a substituted or unsubstituted hydrocarbon group having a carbon number of 2 to 20} and, relative to repeating units constituting the polyketone, the ratio of a repeating unit that is the repeating unit represented by chemical formula (1) where R contains one or more functional groups selected from the group consisting of a hydroxyl group, an ether group, a primary amino group, a secondary amino group, a tertiary amino group, a quaternary ammonium group, a sulfonic acid group, a sulfonic acid ester group, a carboxylic acid group, a carboxylic acid ester group, a phosphoric acid group, a phosphoric acid ester group, a thiol group, a sulfide group, an alkoxysilyl group and a silanol group is from 0.1 to 30 mol %.

[7] The polyketone porous film according to any one of [1] to [6] above, wherein the polyketone contains a structure represented by the following chemical formula (3):

[Chem. 5]

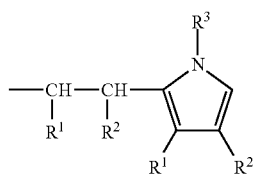
(3)

{wherein each of $R^1$, $R^2$ and $R^3$ is independently a group containing one or more members selected from the group consisting of a hydrogen atom, a halogen atom, an alkyl group having a carbon number of 1 to 20, a hydroxyl group, an ether group, a primary amino group, a secondary amino group, a tertiary amino group, a quaternary ammonium group, a sulfonic acid group, a sulfonic acid ester group, a carboxylic acid group, a carboxylic acid ester group, a phosphoric acid group, a phosphoric acid ester group, a thiol group, a sulfide group, an alkoxysilyl group and a silanol group} in an amount of 30 mass % or less.

[8] The polyketone porous film according to [7] above, wherein in chemical formula (3), both $R^1$ and $R^2$ are hydrogen.

[9] The polyketone porous film according to any one of [1] to [8] above, which has a pore with a long diameter of 0.02 to 20 μm, a short diameter of 0.01 to 5 μm and an ellipticity of 0.5 to 0.95.

[10] The polyketone porous film according to any one of [1] to [9] above, which is in a flat film form.

[11] The polyketone porous film according to any one of [1] to [9] above, which is a hollow fiber membrane having one or more voids penetrating in the longitudinal direction.

[12] The polyketone porous film according to any one of [1] to [11] above, which is a composite comprising the polyketone and at least one nonwoven fabric.

[13] The polyketone porous film according to [12] above, wherein the nonwoven fabric is composed of a thermoplastic synthetic fiber and the nonwoven fabric comprises (A) a nonwoven fabric layer having a fiber diameter of 5 to 20 μm and (B) a nonwoven fabric layer having a fiber diameter of 0.5 to 4 μm in a composite integral manner of A/B/A type or A/B type.

[14] A filter for filtration, obtained by using the polyketone porous film according to any one of [1] to [13] above.

[15] The filter for filtration according to [14] above, which is a filter for water treatment, a filter for membrane bioreactor, a filter for industrial liquid filtration, a filter for deaeration, a filter for removing contamination from gas, a filter for chemical filter, or a medical filter.

[16] A lithium secondary battery separator obtained by using the polyketone porous film according to any one of [10], [12] and [13] above.

[17] A capacitor separator obtained by using the polyketone porous film according to any one of [10], [12] and [13] above.

[18] The capacitor separator according to [17] above, wherein the capacitor is an electrolytic capacitor, an electrical double layer capacitor or a lithium ion capacitor.

[19] A developing phase for immunochromatography, obtained by using the polyketone porous film according to any one of [10], [12] and [13] above.

[20] A scaffold member for cell culture, obtained by using the polyketone porous film according to any one of [10], [12] and [13] above.

Effects of the Invention

The polyketone porous film of the present invention is excellent in the heat resistance and chemical resistance and has a uniform pore diameter distribution in the thickness direction and therefore, when used as a filter for filtration (particularly, a filter medium for microfiltration), not only the particle collection efficiency is high but also a large variety of fluids can be filtered in a wide temperature region. Also, the filter for filtration using the polyketone porous film of the present invention is low in the resistance to a fluid and at the same time, sufficiently traps a particle as the target for removal and a gelled extraneous material hard to remove only through size separation by the pore diameter, and therefore, filtration with low energy and good efficiency is realized. Furthermore, the lithium ion secondary battery and various capacitors each using the polyketone porous film of the present invention as a separator exhibit low internal resistance, high heat resistance and long life. In addition, due to a uniform pore diameter and a high protein adsorptivity of the polyketone itself, the polyketone porous film of the present invention can be utilized also as a developing phase for immunochromatography causing little variation in the absorption speed and as a cell culture scaffold member capable of culturing a normal spherical cell.

BRIEF DESCRIPTION OF THE DRAWINGS

FIG. 7 A schematic view of the spinneret used for forming a hollow fiber membrane as the polyketone porous film in one embodiment of the present invention.

MODE FOR CARRYING OUT THE INVENTION

Figure 1:
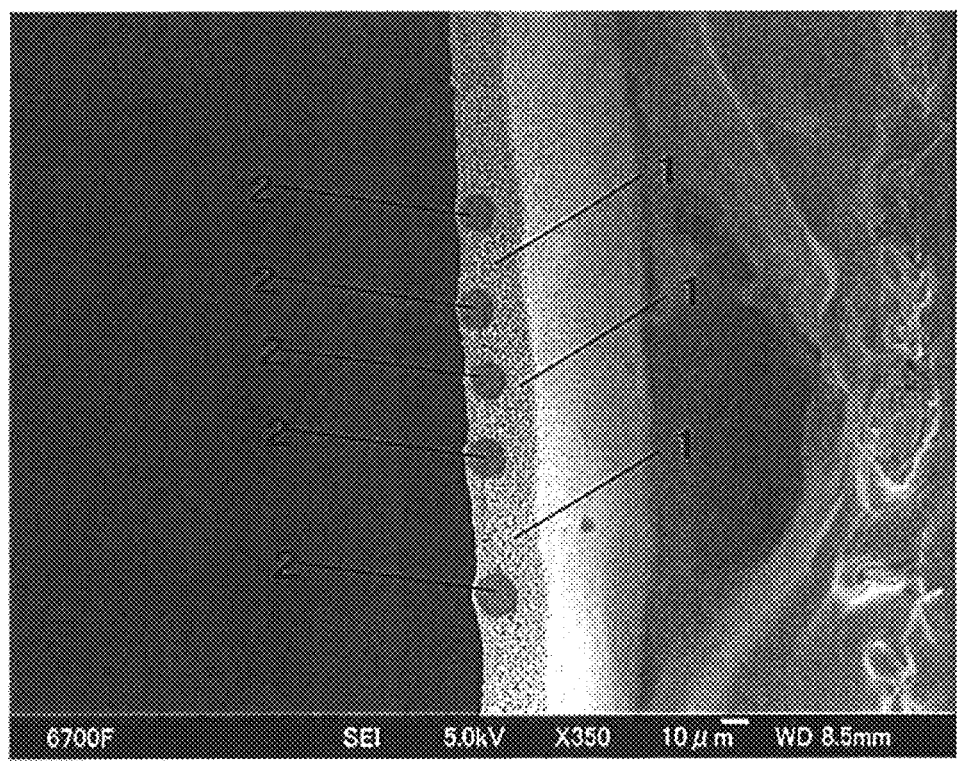
FIG. 1 An image showing an enlarged cross-section of the polyketone porous film in one embodiment of the present invention.

The present invention provides a polyketone porous film comprising a predetermined amount of a polyketone as a copolymer of carbon monoxide and one or more olefins, wherein the polyketone porous film has a pore formed only by a polyketone and the pore diameter uniformity parameter as a value obtained by dividing the standard deviation of the pore diameter in the pore by an average pore diameter is in a predetermined range.

The present invention also provides various members using the polyketone porous film of the present invention. In one embodiment, the present invention provides a filter for filtration obtained by using the polyketone porous film according to the present invention. Examples of the filter for filtration includes a filter for water treatment, a filter for membrane bioreactor, a filter for industrial liquid filtration, a filter for deaeration, a filter for removing contamination from gas, a filter for chemical filter, and a medical filter. In another embodiment, the present invention provides a lithium ion secondary battery separator obtained by using the polyketone porous film according to the present invention. In another embodiment, the present invention provides a capacitor separator obtained by using the polyketone porous film in a flat film form. Examples of the capacitor include an electrolytic capacitor, an electrical double layer capacitor, and a lithium ion capacitor. In another embodiment, the present invention provides a developing phase for immunochromatography and a scaffold member for cell culture, each obtained by using the polyketone porous film in a flat film form.

Typical embodiments of the present invention are described in more detail below.

One embodiment of the present invention provides a polyketone porous film comprising from 10 to 100 mass % of a polyketone as a copolymer of carbon monoxide and one or more olefins, and the polyketone porous film satisfies the condition that the polyketone porous film has a pore formed only by a polyketone, the pore diameter uniformity parameter as a value obtained by dividing the standard deviation of the pore diameter in the pore by an average pore diameter is from 0 to 1.0, and the average through hole diameter of the polyketone porous film is from 0.01 to 50 μm. The polyketone porous film according to one embodiment of the present invention may be composed of substantially only a polyketone or may be composed of a composite of a polyketone and another material (for example, one or more nonwoven fabrics).

In one preferred embodiment of the present invention, the porosity of the polyketone porous film is from 5 to 95%.

The polyketone porous film comprises from 10 to 100 mass % of a polyketone as a copolymer of carbon monoxide and one or more olefins. From the standpoint of reflecting the heat resistance and chemical resistance originally possessed by the polyketone, the content percentage of the polyketone in the polyketone porous film is preferably larger. In the case where the polyketone porous film is a flat film not combined with another material, the polyketone content percentage in the polyketone porous film is preferably from 70 to 100 mass %, more preferably from 80 to 100 mass %, still more preferably from 90 to 100 mass %. Also, in the case of a polyketone porous composite film where a nonwoven fabric or the like is combined with a polyketone, from the standpoint of satisfying both the heat resistance and chemical resistance attributed to the polyketone and the mechanical properties attributed to the nonwoven fabric or the like, the polyketone content percentage in the polyketone porous composite film is preferably from 10 to 70 mass %, more preferably from 10 to 60 mass %, still more preferably from 10 to 50 mass %. The content percentage of the polyketone in the polyketone porous film is confirmed by a method of dissolving and removing a polyketone by using a solvent capable of dissolving only a polyketone out of components constituting the porous film, or a method of dissolving and removing the components except for polyketone by using a solvent capable of dissolving the components except for a polyketone.

In the synthesis of a polyketone, as the olefin copolymerized with carbon monoxide, an arbitrary kind of compound can be selected according to the purpose. The olefin includes, for example, a chain olefin such as ethylene, propylene, butene, hexene, octene and decene, an alkenyl aromatic compound such as styrene and α-methylstyrene, a cyclic olefin such as cyclopentene, norbornene, 5-methyl-norbornene, tetracyclododecene, tricyclodecene, pentacyclopentadecene and pentacyclohexadecene, a halogenated alkene such as vinyl chloride and vinyl fluoride, an acrylic acid ester such as ethyl acrylate and methyl methacrylate, and vinyl acetate. In view of mechanical properties and heat resistance of the polyketone porous film, the number of kinds of olefin copolymerized is preferably from 1 to 3, more preferably from 1 or 2, still more preferably 1.

In one preferred embodiment of the present invention, the polyketone contains a repeating unit represented by the following chemical formula (1):

[Chem. 6]

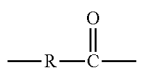

(1)

{wherein R is a substituted or unsubstituted hydrocarbon group having a carbon number of 2 to 20}. R may contain one or more members selected from the group consisting of a hydrogen atom, a halogen atom, a hydroxyl group, an ether group, a primary amino group, a secondary amino group, a tertiary amino group, a quaternary ammonium group, a sulfonic acid group, a sulfonic acid ester group, a carboxylic acid group, a carboxylic acid ester group, a phosphoric acid group, a phosphoric acid ester group, a thiol group, a sulfide group, an alkoxysilyl group and a silanol group. The repeating unit constituting the polyketone (i.e., the ketone repeating unit) may be one kind or a combination of two or more kinds.

In view of mechanical properties and heat resistance of the polyketone porous film, the carbon number of R in chemical formula (1) is more preferably from 2 to 8, still more preferably from 2 to 3, and most preferably 2. In particular, the repeating unit constituting the polyketone preferably contains a larger amount of 1-oxotrimethylene repeating unit represents by the following chemical formula (2):

[Chem. 7]

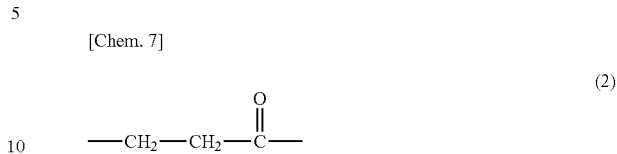

The ratio of the 1-oxotrimethylene repeating unit in the repeating units constituting the polyketone is preferably 70 mol % or more, more preferably 90 mol % or more, still more preferably 95 mol % or more. The ratio of the 1-oxotrimethylene repeating unit may be 100 mol %. On the other hand, the repeating unit constituting the polyketone may contain 0.1 mol % or more a structure other than the 1-oxotrimethylene repeating unit, as described later. 100 mol % as used above means that except for the polymer terminal group, a repeating unit other than 1-oxotrimethylene is not observed in a known analyzing device such as elemental analysis, NMR (nuclear magnetic resonance) and gas chromatography. Typically, the structure of the repeating unit constituting the polyketone and the amount of each structure are confirmed by NMR.

In the polyketone porous film, the pore diameter of the pore formed only by a polyketone (hereinafter, sometimes referred to as the pore diameter in the polyketone part) is uniform in the thickness direction. Whether the pore diameter in the polyketone is uniform as above is evaluated by measuring the pore diameter in the portion where the pore is formed only by a polyketone, in the thickness-direction cross-section of the polyketone porous film.

The pore diameter in the polyketone part is measured by the following method. That is, an electron micrographic image of the cross-section of the polyketone porous film is photographed and with respect to the pore formed only by a polyketone, the equivalent-circle diameter of the target pore is determined through a digitization process by using an image analyzer. The pore diameter is measured, for example, in 5 visual fields while shifting in the thickness direction of the film and by calculating the arithmetic mean value and the standard deviation from the equivalent-circle diameters of all pores measured, the former and the latter are taken as the average diameter (μm) and the standard deviation (μm) of pore diameter, respectively. The value obtained by dividing the standard deviation of pore diameter by the average pore diameter is designated as the pore diameter uniformity parameter.

FIG. 1 is an image showing an enlarged cross-section of the polyketone porous film in one embodiment of the present invention.

FIG. 1 is a cross-sectional image of the thickness-direction cross-section by an electron microscope of the polyketone porous film obtained by combining a polyketone and a polyester nonwoven fabric. The cross-section of the polyketone porous film shown in FIG. 1 shows the emergence of a polyketone part 1 having a large number of micropores and a polyester fiber part 2 constituting the nonwoven fabric and reveals that the pore diameter in the polyketone part 1 is uniform. The degree of uniformity of the pore diameter in the polyketone part is indicated by a value obtained by dividing the standard deviation of the pore diameter in the polyketone part by the average pore diameter (i.e., "pore diameter uniformity parameter"). In the case where all pore diameters in the polyketone part are the same, the pore diameter uniformity parameter becomes 0.

The pore diameter uniformity parameter is from 0 to 1.0. If a polyketone porous film having a pore diameter uniformity parameter in excess of 1.0 is used, for example, as a filter medium, the film comes to have many large pores compared with the particle diameter of the target particle for trapping and because of a low particle trapping ability of the large pore, the particle collection efficiency as the whole porous film is extremely reduced. Also, in the filtration of a gelled extraneous material, the gelled extraneous material once trapped in the film readily escapes from the large pore due to the pressure rising with the elapse of filtering time. In addition, for example, in a battery or capacitor using the polyketone porous film as the separator, the large pore existing in the separator allows contact between the anode and the cathode, and a short circuit is very likely to occur. The pore diameter uniformity parameter is preferably from 0 to 0.8, more preferably from 0 to 0.6.

The polyketone porous film has an average through hole diameter of 0.01 to 50 μm. The average through hole diameter is a value measured by a half dry method (in conformity to ASTM E1294-89). If a polyketone porous film having an average through hole diameter of less than 0.01 μm is used, for example, as a filter medium, a significant increase in the pressure loss or a significant decrease in the permeation flux occurs due to the too small average through hole diameter. Also, for example, in a battery or capacitor using the polyketone porous film as the separator, the permeation resistance to ion and the like becomes very large, and the internal resistance increases significantly. On the other hand, if a polyketone porous film having an average through hole diameter of more than 50 μm is used, for example, as a filer for filtration, because of the too large average through hole diameter, the removable particle is limited. Furthermore, for example, in a battery or capacitor using the polyketone porous film as the separator, contact between electrodes readily occurs, and a short circuit is caused very often. The average through hole diameter of the polyketone porous film is preferably from 0.02 to 40 μm, more preferably from 0.03 to 30 μm, still more preferably from 0.05 to 20 μm.

The polyketone porous film according to one embodiment of the present invention preferably has a porosity of 5 to 95%. The porosity is calculated by the following mathematical expression:

Porosity (%)=(1−G/ρ/V)×100

{wherein G is the mass (g) of the polyketone porous film, ρ is the mass average density (g/cm$^3$) of all resins constituting the polyketone porous film, and V is the volume (cm$^3$) of the polyketone porous film}.

In the mathematical formula above, in the case where the polyketone porous film is composed by combining a resin differing in the density from the polyketone and a polyketone resin, the mass average density ρ is the sum of values obtained by multiplying the densities of respective resins by the constitution mass ratio thereof. For example, when a nonwoven fabric composed of fibers having densities $\rho_A$ and $\rho_B$ in mass proportions $G_A$ and $G_B$, respectively, is combined with a polyketone having a density $\rho_P$ in a mass proportion $G_P$, the mass average density is represented by the following mathematical expression:

Mass average density=$(\rho_A \cdot G_A + \rho_B \cdot G_B + \rho_P \cdot G_P)/(G_A + G_B + G_P)$ When a polyketone porous film having a porosity of 5% or more is used, for example, as a filter medium, this offers advantages such as large permeation flux, good particle collection efficiency and long time until clogging. Also, for example, in a battery or capacitor using the polyketone porous film as the separator, a high electrolytic solution retaining property and a large ion permeation speed are advantageously achieved. On the other hand, when the porosity of the polyketone porous film is 95% or less, the polyketone porous film is kept from significantly lowering in the mechanical strength and the risk of frequently causing a breakage during production or use of a filter, a battery, a capacitor or the like can be avoided. The porosity of the polyketone porous film of the present invention is more preferably from 30 to 95%, still more preferably from 40 to 90%, and most preferably from 50 to 90%.

In the present invention, from the standpoint of imparting the later-described additional functions to the polyketone porous film, the repeating unit constituting the polyketone preferably contains, in a ratio of 30 mol % or less, a repeating unit represented by chemical formula (1) where R contains one or more functional groups selected from the group consisting of a hydroxyl group, an ether group, a primary amino group, a secondary amino group, a tertiary amino group, a quaternary ammonium group, a sulfonic acid group, a sulfonic acid ester group, a carboxylic acid group, a carboxylic acid ester group, a phosphoric acid group, a phosphoric acid ester group, a thiol group, a sulfide group, an alkoxysilyl group and a silanol group (hereinafter, sometimes referred to as a substituent-containing unit). In a particularly preferred embodiment, the substituent group-containing unit has a structure where at least one or more hydrogen atoms in the repeating unit represented by chemical formula (2) are substituted for by one or more functional groups recited above.

In the repeating unit constituting the polyketone, the ratio of the substituent-containing unit is preferably from 0.1 to 30 mol %. When the ratio is 0.1 mol % or more, the practical effects of the substituent are successfully exerted, and when the ratio is 30 mol % or less, the strength (for example, tensile strength), heat resistance and chemical resistance of the polyketone porous film are good, which is advantageous in practical use. From the standpoint of successfully exerting the effects of the substituent while keeping the strength, heat resistance and chemical resistance, the ratio above is more preferably from 0.2 to 15 mol %, still more preferably from 0.5 to 10 mol %, and most preferably from 1 to 5 mol %. As for the functional group, an arbitrary kind of functional group and arbitrary number of functional groups can be selected according to the purpose. For example, in the case of using the polyketone porous film as a filter medium, it is effective for avoiding clogging due to adsorption of protein and the like to select a hydrophilic functional group. Also, in the case of using the polyketone porous film as the separator of a battery or a capacitor, the permeation resistance to ion and the like can be reduced by selecting a functional group capable of increasing the wettability to an electrolytic solution or the like. Depending on the purpose, a functional group having a secondary function may be further selected and, for example, by selecting a functional group such as quaternary ammonium group and sulfonic acid group, an ion exchange function can be imparted to the polyketone porous film.

From the standpoint of providing a good function to the polyketone porous film, the polyketone may be a copolymer containing a structure represented by the following chemical formula (3):

[Chem. 8]

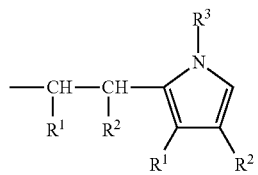

(3)

{wherein each of $R^1$, $R^2$ and $R^3$ is independently a group containing one or more members selected from the group consisting of a hydrogen atom, a halogen atom, an alkyl group having a carbon number of 1 to 20, a hydroxyl group, an ether group, a primary amino group, a secondary amino group, a tertiary amino group, a quaternary ammonium group, a sulfonic acid group, a sulfonic acid ester group, a carboxylic acid group, a carboxylic acid ester group, a phosphoric acid group, a phosphoric acid ester group, a thiol group, a sulfide group, an alkoxysilyl group and a silanol group} (hereinafter, sometimes referred to as a pyrrole component). The mass ratio of the pyrrole component in the polyketone is preferably 30 mass % or less, more preferably from 0.1 to 30 mass %. When the mass ratio is 0.1 mass % or more, in the polyketone porous film comprising a polyketone composed of a polyketone chain and the above-described component, practical effects due to comprising the pyrrole component are successfully exerted, and when the mass ratio is 30 mass % or less, the strength, heat resistance and chemical resistance of the polyketone porous film are good, which is advantageous in practical use. The mass ratio is still more preferably from 0.5 to 20 mass %, yet still more preferably from 1 to 10 mass %.

Incidentally, as for the substituents $R^1$, $R^2$ and $R^3$ in chemical formula (3), an arbitrary kind of substituent and arbitrary number of substituents can be selected from the substituents described above. For example, in the case of using the polyketone porous film as a filter medium, it is effective for avoiding clogging due to adsorption of protein and the like to select a hydrophilic functional group. Also, in the case of using the polyketone porous film as the separator of a battery or a capacitor, the permeation resistance to ion and the like can be reduced by selecting a functional group capable of increasing the wettability to an electrolytic solution or the like. Depending on the purpose, a functional group having a secondary function may be further selected and, for example, by selecting a functional group such as quaternary ammonium group and sulfonic acid group, an ion exchange function can be imparted. In this way, various functional groups can be selected. Among others, when both $R^1$ and $R^2$ in the formula are hydrogen, this is advantageous and preferred in view of mechanical properties.

The shape of the pore of the polyketone porous fiber is not particularly limited as long as the above-described pore diameter uniformity parameter and average through hole diameter are satisfied, and the shape may be circular, flat or the like. A porous film having arranged therein mainly circular pores is preferred, because the collection performance in use, for example, as a filter medium and the permeation performance for ion and the like in use, for example, as a separator are stabilized, and this porous film has an advantage of enabling its easy application to general fields.

On the other hand, in specific usage, a porous film having arranged therein flat pores is sometimes suited. The flat pore is preferably a pore having a long diameter of 0.02 to 20 μm, a short diameter of 0.01 to 5 μm and an ellipticity of 0.5 to 0.95. Here, the long diameter and short diameter of the pore is the dimension of the pore in the thickness-direction cross-section of the polyketone porous film, and the long diameter and the short diameter are the maximum diameter and the minimum diameter of one pore. Also, the ellipticity is a value represented by ellipticity=(b−a)/b where a is the short diameter of the pore and b is the long diameter. That is, when the ellipticity is 0, the cross-section of the pore is a perfect circle. As the cross-sectional shape of the pore approaches linear shape, the ellipticity comes close to 1. The shape of the pore having a long diameter, a short diameter and an ellipticity in the above-described ranges is not particularly limited and may be, in addition to ellipse, a polygon such as triangle and tetragon, or an infinite form. For example, in the case where a porous film having flat pores is used as a filter medium, when a fluid as the target for filtration is flowed in a cross-flow system to the direction where many flat pores are oriented (i.e., the direction where a larger number of pores have the long diameter), the possibility of the particle as the target for removal coming into contact with the pore increases and in turn, the separation efficiency rises. Also, the polyketone porous having flat pores is advantageous in sucking up a solution by a capillary phenomenon and therefore, is suited for utilization, for example, as the developing phase of immunochromatography. In utilization as the developing phase of immunochromatography, a polyketone porous film having a short diameter of less than 0.01 μm tends to exhibit a small absorption amount of a liquid, and a circular hole tends to exhibit a low absorption speed. In order to increase the absorption speed, the polyketone porous film preferably has an elliptical pore having an ellipticity of 0.5 or more, and as the ellipticity is larger, the absorption speed increases. However, if the ellipticity exceeds 0.95, the mechanical strength of the polyketone porous film tends to decrease. From these standpoints, the ellipticity of the polyketone porous film as the developing phase of immunochromatography is preferably from 0.5 to 0.95, more preferably from 0.6 to 0.9, and most preferably from 0.7 to 0.9.

The pore size is preferably larger because the absorption amount is increased, but if the size is too large, a liquid once absorbed cannot be held and sometimes bleeds out of the polyketone porous film. From these standpoints, the long diameter of the flat pore is preferably from 0.02 to 20 μm, and the short diameter is preferably from 0.01 to 5 μm. Also, by considering the aspects such as absorption amount and absorption speed, the long diameter is more preferably from 0.2 to 16 μm, and the short diameter is more preferably from 0.1 to 3 μm.

In the case where the pore of the polyketone porous film has a flat shape, it is also preferred that the pores are aligned in their direction in view of advantage in the filtration by a cross-flow system and the absorption speed. The pores being aligned in the direction indicates that when the shape of the pore is approximated to an ellipse, the direction of a long axis connecting two focal points of the ellipse approximated is aligned substantially in parallel. Incidentally, the approximation of the pore shape to an ellipse is performed by the method of least squares from arbitrary 10 or more points in the outer circumference of the pore. Also, the acute angle formed by straight lines with each other including respective long axes is preferably within 30° at a maximum, more preferably within 15° at a maximum. The acute angle above is obtained by the method where a transverse cross-section slice cut out from the polyketone porous film as the target for observation is observed at a magnification of 5,000 to 50,000 in 5 or more visual fields by an electron microscope, an arbitrary pair of pores observed in each visual field are approximated to an ellipse by the method above, the acute angle formed by long axes of the paired ellipses is measured, and the arithmetic mean value of all visual fields is determined.

The shape of the polyketone porous film is not particularly limited. However, as a preferred example, the polyketone porous film is in a flat film form, and as another preferred example, the polyketone porous film is a hollow fiber membrane having one or more voids penetrating in the longitudinal direction. The shape of the polyketone porous film can be selected and used according to the purpose and usage.

Figure 2:
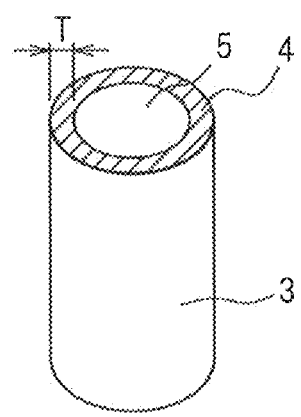
FIG. 2 A schematic view of a hollow fiber membrane as the polyketone porous film in one embodiment of the present invention.

FIG. 2 is a schematic view of a hollow fiber membrane in one embodiment of the present invention. The hollow fiber membrane 3 shown in FIG. 2 has, in the inside thereof, at least one void 5 penetrating in the longitudinal direction (hereinafter, sometimes referred to as a hollow part). In the hollow fiber membrane 3 shown in FIG. 2, the cross-section 4 of the hollow fiber membrane has a ring shape. The hollow fiber membrane is suited particularly for a filter application. In the case where the polyketone porous film is a hollow fiber membrane, the ratio of the hollow part to the volume of the whole hollow fiber membrane including the volume of the hollow part, i.e., the hollow ratio, is not particularly limited, but if the hollow ratio is too low, the separation efficiency of the film tends to be decreased and if the hollow ratio is too high, the mechanical properties of the hollow fiber membrane are likely to deteriorate. From these standpoints, the hollow ratio is preferably from 10 to 70 vol %, more preferably from 20 to 60 vol %. The hollow ratio is calculated from the inner diameter r and the outer diameter R of the hollow fiber membrane according to the following calculation formula:

Hollow ratio (%)=$(r^2/R^2)\times100$

The number of hollow parts existing in one hollow fiber membrane is not particularly limited and may be 1 or a plural number. The outer diameter of the hollow fiber membrane is not particularly limited, but an outer diameter of 100 to 5,000 μm is suitably used. The hollow fiber membrane may be used as a single filament or as a multifilament. As the outer shape of the cross-section of the hollow fiber membrane, conventionally known shapes such as circle, ellipse, triangle, star and alphabet can be applied. Also, the thickness of the hollow fiber membrane (for example, the thickness T of the hollow fiber membrane shown in FIG. 2) is selected by taking into account the balance with the outer diameter and the hollow ratio but is usually from 8 to 1,700 μm.

In another example, the shape of the polyketone porous film is a sheet-like flat film. The flat film is suitable as a filter medium and also suited for use as a separator of a battery, a capacitor and the like. The thickness of the flat film is not particularly limited, and an arbitrary thickness may be selected according to the usage, but the thickness is usually from 0.1 to 1,000 μm. In the case of using the polyketone porous film as a filter medium, in view of downsizing of the module and wideness of the effective filtration area, the thickness of the polyketone porous film is preferably smaller and is preferably 500 μm or less. The thickness of the polyketone porous film as a filter medium is more preferably 200 μm or less, still more preferably 150 μm or less, and most preferably 100 μm or less. Also, in the case of using the polyketone porous film as the separator for a battery or a capacitor, taking into account, for example, the increase of battery capacity and the downsizing of capacitor, the thickness of the polyketone porous film is preferably smaller and is preferably 70 μm or less. The thickness of the polyketone porous film as the separator for a battery or a capacitor is more preferably 50 μm or less, still more preferably 40 μm or less, and most preferably 30 μm or less. Considering the mechanical strength in both applications above, the thickness of the polyketone porous film is preferably 5 μm or more, more preferably 10 μm or more, still more preferably 15 μm or more, and most preferably 20 μm or more. Furthermore, in both applications above, the uniformity of thickness of the polyketone porous film is very important, and the number average of the minimum value/maximum value ratio of the thickness measured at arbitrary 100 points is preferably 0.6 or more, more preferably 0.7 or more, still more preferably 0.8 or more.

Figure 3:
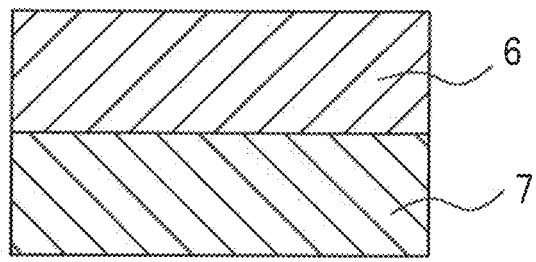
FIG. 3 A cross-sectional schematic view of the polyketone porous film obtained by combining a polyketone and a nonwoven fabric in one embodiment of the present invention.
Figure 4:
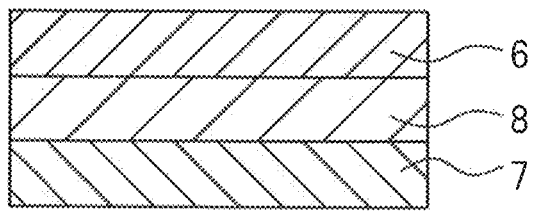
FIG. 4 A cross-sectional schematic view of the polyketone porous film obtained by combining a polyketone and a nonwoven fabric in one embodiment of the present invention.
Figure 5:
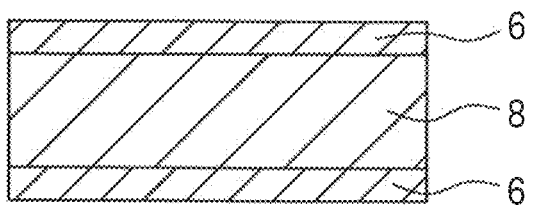
FIG. 5 A cross-sectional schematic view of the polyketone porous film obtained by combining a polyketone and a nonwoven fabric in one embodiment of the present invention.

In one embodiment, the polyketone porous film of the present invention may be a composite comprising a polyketone and at least one nonwoven fabric. FIGS. 3 to 5 are a cross-sectional schematic view of the polyketone porous film obtained by combining a polyketone and a nonwoven fabric in one embodiment of the present invention. Examples of the embodiment where a polyketone and a nonwoven fabric are combined are described below by referring to FIGS. 3 to 5. This embodiment includes, for example, an embodiment where, as shown in FIG. 3, a polyketone part 6 in a flat film form and a nonwoven fabric part 7 are adhered by arranging respective surfaces to form an interface; an embodiment having, as shown in FIG. 4, a polyketone part 6, a nonwoven fabric part 7, and a composite part 8 where the nonwoven fabric is impregnated with the polyketone; and an embodiment having, as shown in FIG. 5, polyketone parts 6 and a composite part 8 formed by completely embracing a nonwoven fabric (the nonwoven fabric is impregnated with the polyketone) therebetween. The embodiment having a composite part shown, for example, in FIGS. 4 and 5 is preferred in that separation between the polyketone and the nonwoven fabric is suppressed. Also, in the polyketone porous film in a flat film form, the polyketone part may be combined on one surface of the nonwoven fabric part or may be combined on both surfaces of the nonwoven fabric part.

As the nonwoven fabric, generally known nonwoven fabric can be used according to the purpose and usage. The fiber constituting the nonwoven fabric is not particularly limited, and examples thereof include a short fiber and a long fiber of spun bond type. In terms of no possibility of causing the falling off of fiber constituting the nonwoven fabric during use and the production cost, a long-fiber nonwoven fabric of spun bond type is preferred. The resin constituting the nonwoven fabric used in the present invention includes, for example, a polyester-based resin, a polyamide-based resin, a polyolefin-based resin, a polyphenylene sulfide-based resin, and a fluorine-based resin. The polyester-based resin includes polyethylene terephthalate, polytrimethylene terephthalate, polybutylene terephthalate, and the like. The polyamide-based resin includes nylon 6, nylon 66, nylon 610, nylon 612, and the like. The polyolefin-based resin includes polyethylene, polypropylene, and the like. The polyphenylene sulfide-based resin includes resins such as oxidation crosslinking type and straight chain type. The fluorine-based resin includes polytetrafluoroethylene, polyvinylidene fluoride, and the like.

In general, a polyester-based resin is used in the case of attaching importance to the heat resistance, and a polyolefin-based resin is used in the case of attaching chemical resistance. Also, in the case of satisfying both the heat resistance and the chemical resistance, a polyphenylene sulfide-based resin or a fluorine-based resin is used. Considering good processability, a polyphenylene sulfide-based resin is preferred. All of the above-described nonwoven fabrics may be subjected to a hydrophilization treatment by plasma irradiation or the like, if desired.

The nonwoven fabric is preferably composed of a thermoplastic synthetic fiber. Also, the nonwoven fabric preferably comprises (A) a nonwoven fabric layer having a fiber diameter of 5 to 20 μm and (B) a nonwoven fabric layer having a fiber diameter of 0.5 to 4 μm in a composite integral manner of A/B/A type or A/B type. The composite integration can be realized by welding and the like. The nonwoven fabric consists of a fiber and a void as a gap between fibers, and by employing the above-described nonwoven fabric structure, a large void continuously connected in the thickness direction is not created, so that a uniform thickness can be realized by combining the polyketone resin and the nonwoven fabric. Furthermore, in the case of the polyketone porous film having a structure in which a porous film of the polyketone resin is combined to one surface of the nonwoven fabric, since the fiber of the (B) nonwoven fabric layer having an ultrafine fiber is thin and creates only a small void, an effect of preventing a dope of the polyketone resin from permeating the side opposite the coated surface is produced, so that a more uniform polyketone porous film can be produced. Incidentally, in the case where the nonwoven fabric is A/B type, the polyketone may be combined to the surface A side or combined to the surface B side. The fiber diameter above is measured by observing the cross-section of the polyketone porous film through an optical microscope or an electron microscope.

From the standpoint that handleability is good in producing a filter, a battery or a capacitor and the productivity is high, the tensile strength of the polyketone porous film comprising a nonwoven fabric is preferably 5 MPa or more, more preferably 10 MPa or more. The tensile strength is a value measured as the rupture strength by using a tensile strength tester.

The intrinsic viscosity (this is an index of the molecular weight) of the polyketone constituting the polyketone porous film of the present invention is not particularly limited but in view of mechanical properties and moldability, is preferably from 0.1 to 10 dl/g. The polyketone porous film composed of a polyketone having an intrinsic viscosity of 0.1 dl/g or more has a high strength and suited for use as a filter member. Furthermore, in the polyketone having an intrinsic viscosity of 0.1 dl/g or more, the content of oligomer component easily soluble in water and various organic solvents is small. The polyketone porous film obtained by molding such a polyketone is suitably used as a filter medium prohibiting mixing of an impurity or a separator for a battery or a capacitor. On the other hand, the polyketone having an intrinsic viscosity of 10 dl/g or less is advantageous in view of production cost and is also advantageous from the practical aspect, because a porous film having a uniform thickness is easily formed. The intrinsic viscosity of the polyketone is more preferably from 0.5 to 6 dl/g. The intrinsic viscosity is a value determined based on the following definitional equation:

$$[\eta] = \lim_{C \to 0} (T-t)/(t \cdot C) [dl/g] \qquad \text{[Math. 1]}$$

{wherein t is the flow time of hexafluoroisopropanol with a purity of 98% or more through the viscosity tube at 25° C., T is the flow time of a dilute solution of polyketone dissolved in hexafluoroisopropanol through the viscosity tube at 25° C., and C is the mass value in gram unit of the solute (i.e., polyketone) in 100 ml of the solution above}.

The melting point of the polyketone comprised in the porous film of the present invention is not particularly limited, but a higher melting point of the polyketone is advantageous to use in a high temperature environment. The melting point of the polyketone is preferably 180° C. or more, more preferably 200° C. or more, still more preferably 220° C. or more, and most preferably 240° C. or more. The melting point is defined as the starting point of heat absorption due to melting of the polyketone in the temperature rise process of differential thermal measurement.

Figure 6:
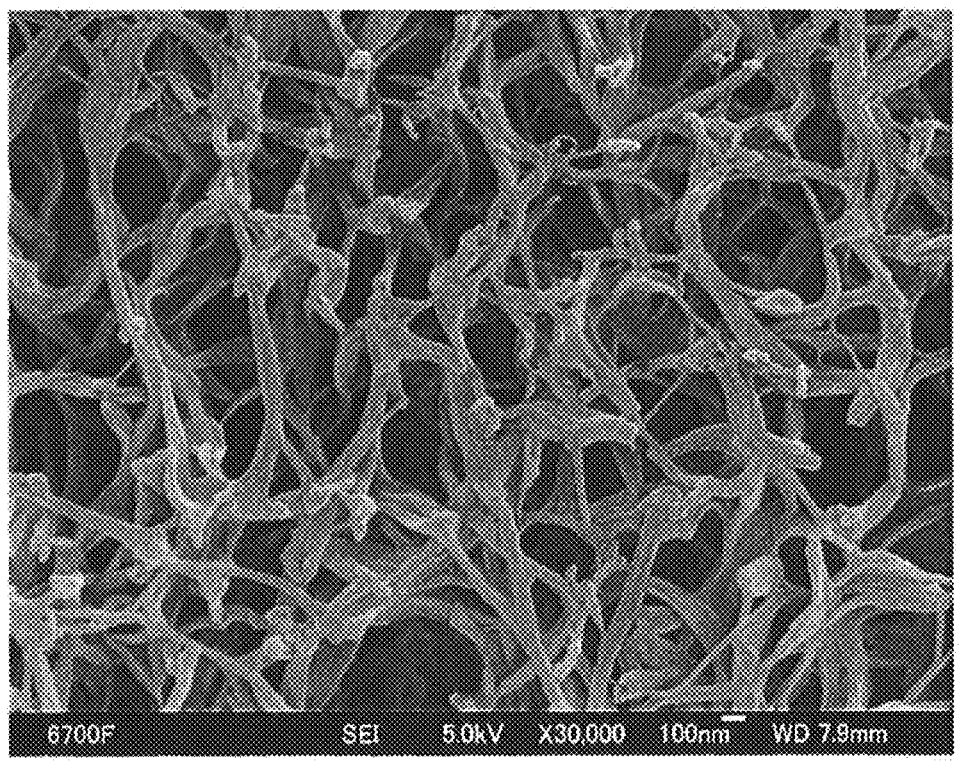
FIG. 6 An image showing an enlarged cross-section of the polyketone porous film in one embodiment of the present invention.

FIG. 6 is an image showing an enlarged cross-section of the polyketone porous film in one embodiment of the present invention. In the polyketone porous film shown in FIG. 6, the surface is composed of a fibrous polyketone. In the polyketone porous film of the present invention, as shown in FIG. 6, the polyketone part can be a fibrous structure. Due to this structure, pores are formed in the polyketone part. Also, in the fibrous polyketone structure, the ratio of the number of fibrous materials having a size of 0.5 μm or less to the total number of fibrous materials is preferably 70% or more. When the ratio is 70% or more, in use as a filter medium a so-called slip-flow effect is successfully produced, and the permeation resistance to a fluid is reduced. Also, as compared with conventional filter mediums, the surface area per unit volume is greatly increased and therefore, in the case where the polyketone has an adsorption capacity to a substance as the target for removal, the removal ratio for the substance is significantly increased. Furthermore, in utilization as the separator of a battery or a capacitor, because of a small content of a thick fibrous structure, the permeation resistance to ion and the like is reduced. The ratio above is more preferably 75% or more, still more preferably 80% or more. This ratio is calculated by the method where an image obtained by photographing the cross-section of the polyketone porous film by a scanning electron microscope is digitized and subjected to an image processing according to the later-described procedure.

In the polyketone porous film the pore portion does not contribute to the strength and therefor, the stress/strain concentrates on the polyketone working out to a support. For this reason, the microstructure of the polyketone is preferably a strong structure. In particular, the crystallization degree is an important parameter, and a higher value leads to higher strength, higher dimensional stability, higher heat resistance and higher chemical resistance. Accordingly, the crystallization degree of the polyketone is preferably 35% or more, more preferably 40% or more, still more preferably 50% or more. Assuming that the heat absorption peak of melting in the temperature rise process of differential thermal measurement is ΔH (J/g) and the melting heat of the polyketone crystal is $\Delta H_0$ (J/g), the crystallization degree (%) is determined by crystallization degree (%)=$\Delta H/\Delta H_0 \times$ 100.

In the case of using the polyketone porous film of the present invention as a non-aqueous filter medium or as the separator for a battery or a capacitor, the moisture absorptivity is preferably low. The moisture absorptivity is a value represented by moisture absorptivity=$(T_1-T_0)/T_0 \times 100(\%)$, where $T_0$ is the mass after absolute drying of the polyketone porous film in an oven at 105° C. for 2 hours and $T_1$ is the mass after subsequent standing still at 23° C. and RH 50% for 24 hours. If the water absorptivity of the polyketone porous film is high, in use as a filter medium, water itself may be an impurity, or may cause hydrolysis of the target for filtration to produce a further impurity. Also, in the case of using the polyketone porous film as the separator for a battery or a capacitor, a gas may be evolved due to electrolysis of water, and the evolved gas may cause swelling of the battery or capacitor to involve deterioration of the electrode or reduction in the battery or capacitor performance. For this reason, the moisture absorptivity of the polyketone porous film is preferably 3% or less, more preferably 1% or less, still more preferably 0.5% or less.

The polyketone porous film of the present invention may comprise a functional substance such as inorganic filler, light stabilizer, antioxidant, antistatic agent, hydrophilic polymer and protein-adsorbing substance. Specifically, the polyketone porous film may comprise, as the inorganic filler, an inorganic fiber such as glass fiber and carbon fiber, a carbon nanotube or the like so as to increase the mechanical strength, impact resistance and heat resistance. Also, the polyketone porous film may comprise an ultraviolet absorber, a hindered amine-based light stabilizer or the like as the light stabilizer or may comprise a phenol-based, phosphorus-based, sulfur-based or other antioxidants as the antioxidant, so as to enhance the stability to light and oxidation. Furthermore, the polyketone porous film may comprise various surfactants or the like as the antioxidant. In addition, the polyketone porous film may comprise, for example, a hydrophilic polymer such as polyethylene glycol, polyvinyl alcohol, polyvinylpyrrolidone and collagen so as to increase the hydrophilicity or may comprise nitrocellulose or the like so as to improve the protein adsorptivity.

The total content of these functional substances is preferably 30 parts by mass or less per 100 parts by mass of the polyketone porous film. When the total content is 30 parts by mass or less, reduction in the strength of the polyketone porous film and falling off or elution of the functional substance are less likely to occur and this is preferred. The total content is more preferably 20 parts by mass or less, still more preferably 10 parts by mass or less.

The maximum pore diameter of the polyketone porous film is preferably 70 μm or less as measured by the bubble point method (in conformity to ASTM F316-86 or JIS K3832). A maximum pore diameter of 70 μm or less is advantageous as the filter for filtration in that reduction in the trapping efficiency is less likely to occur, and is advantageous as the separator of a battery or a capacitor in that a short circuit between the anode and the cathode is less likely to occur. The maximum pore diameter is preferably 50 μm or less, more preferably 30 μm or less, and most preferably 20 μm or less.

The air permeation resistance of the polyketone porous film is preferably 1,000 seconds/100 ml or less as measured by the Gurley method (in conformity to JIS P8117). A larger numerical value of air permeation resistance indicates more difficult permeation of air and, more specifically, indicates that the pore diameter is small, the number of vacancies is small or the penetration path of vacancy is long. Conversely, when the pore diameter is large and the number of vacancies is large, the numerical value of air permeation resistance becomes small and after reaching a certain range, becomes almost zero seconds, making it substantially impossible to perform measurement and comparison. A battery or capacitor using, as the separator, a polyketone porous film having an air permeation resistance of 1,000 seconds/100 ml or less is advantageous in that due to the large ion permeation speed, a problem of causing a rise in the internal resistance is less likely to occur. The air permeation resistance is more preferably 800 seconds/100 ml or less, still more preferably 400 seconds/100 ml or less, and most preferably 300 seconds/100 ml or less.

In the polyketone porous film, if desired, the polyketone may be three-dimensionally crosslinked for the purpose of enhancing the chemical resistance and heat resistance. Due to three-dimensional crosslinking, the polyketone is insolubilized in a solvent and its deformation by heat is also improved. The three-dimensionally crosslinked structure is not particularly limited and includes, for example, an aldol-condensed structure by a heat treatment, and a crosslinked structure by a diamine compound (i.e., a pyrrole ring structure crosslinked by a methylene chain; for details, International Publication No. 2010/33027, pamphlet may be referred to). The three-dimensional crosslinking is preferably performed after forming the polyketone porous film. The degree of crosslinking reaction varies depending on the chemical and solvent to which the polyketone porous film is exposed, and the temperature, but when the polyketone is stirred in hexafluoroisopropanol (25° C.) for 3 hours, the ratio of the mass of polyketone remaining as a solid matter without dissolving to the mass of polyketone before dissolving is preferably 50 mass % or more, more preferably 70 mass % or more.

One example of the production method for the polyketone porous film of the present invention is described below.

The production method for the polyketone as a raw material of the porous film is not particularly limited, and the polyketone may be produced by a known method described, for example, in International Publication No. 2003/055934, pamphlet.

The polyketone porous film is preferably produced by wet molding. That is, the polyketone porous film is preferably produced by dissolving the polyketone obtained by the above-described known method in a solvent to prepare a polyketone dope, molding the dope into a desired shape, and subjecting the molded product to solidification, washing and drying.

The solvent for dissolving the polyketone is not particularly limited, and a known solvent, for example, an organic solvent such as hexafluoroisopropanol, propylene carbonate and m-cresol, an aqueous resorcin solution, and an aqueous solution of a metal salt such as zinc chloride, zinc chloride/calcium chloride, zinc chloride/lithium chloride, zinc chloride/calcium thiocyanate, zinc chloride/calcium chloride/lithium chloride and zinc chloride/calcium chloride/calcium thiocyanate, may be used. However, for producing a porous film having a uniform pore diameter in the thickness direction, which is a characteristic feature of the present invention, selection of the solvent and combination with a coagulation solution to cause phase separation of the polyketone dope are important. More specifically, it is important to select, as the solvent, a solvent capable of sufficiently and successfully dissolving the polyketone and select, as the coagulation solution, a non-solvent capable of causing phase separation of the polyketone dope at an appropriate speed. For these reasons, the solvent used for producing the polyketone porous film is preferably hexafluoroisopropanol, m-cresol, an aqueous resorcin solution or the like. In the following, as one example of the production method for the polyketone porous film of the present invention, a method using an aqueous resorcin solution is described.

The resorcin concentration in the aqueous resorcin solution is, in view of solubility and structure of the polyketone, preferably from 60 to 80 mass %, more preferably from 60 to 75 mass %, still more preferably from 60 to 70 mass %.

The polyketone powder is mixed with the aqueous resorcin solution, heated, stirred and, if desired, defoamed under reduced pressure or under pressure to form a polyketone dope. As for the combination of the intrinsic viscosity of the polyketone used here with the polyketone concentration in the dope (hereinafter, sometimes referred to as the polymer concentration), from the standpoint of ensuring the mechanical strength high enough to maintain the structure of the polyketone porous film, the moldability and the uniform dissolution, a combination of an intrinsic viscosity of 0.1 to 10 dl/g and a polymer concentration of 1 to 50 mass % is preferred, and a combination of an intrinsic viscosity of 0.5 to 6 dl/g and a polymer concentration of 3 to 20 mass % is more preferred. This combination is appropriately determined by taking into consideration the viscosity of polyketone dope and the structure of polyketone porous film. In particular, the polymer concentration affects the pore diameter of the final polyketone porous film and therefore, its control is important.

One example of the production method when the polyketone porous film is a sheet-like flat film is described. In the case of molding the polyketone into a sheet form, a relatively low dope viscosity is suited in view of moldability. From this viewpoint, the dope density at the molding temperature is preferably from 10 to 1,000 poise. When the dope viscosity is 10 poise or more, the dope is kept from becoming excessively flowable and the film shape can be maintained uniform, making it possible to form a flat film with little defects. On the other hand, when the dope viscosity is 1,000 poise or less, it is advantageously easy to make the thickness of the polyketone porous film uniform. The dope viscosity is more preferably from 50 to 500 poise. The dope viscosity is measured by a B-type viscometer in the state of keeping the dope at the molding temperature.

The method for molding the flat film includes, in the batch system, a method of casting the dope in a sheet form on the top of a base material such as glass plate, metal plate and plastic film by using an applicator. In the continuous system, for example, a method of continuously coating the polyketone dope on a running base material by using a device such as die coater, roll coater and bar coater, and a method of extruding the polyketone dope in a sheet form into air from a T-die or the like, may be used. The dope temperature at the coating or extrusion is appropriately adjusted to give the above-described preferred dope viscosity but usually, is preferably from 15 to 90° C. When the dope temperature is 15° C. or more, the thickness of the film can be easily made uniform by suppressing an increase in the dope viscosity and at the same time, precipitation of resorcin in the dope can be avoided. Also, when the dope temperature is 90° C. or less, the dope can be prevented from a change in the composition due to evaporation of water in the solvent and the intended structure control is facilitated.

Subsequently, the sheet-like polyketone dope coated or extruded into air is immersed in a coagulation solution capable of dissolving the resorcin. Considering the recovery of solvent, it is preferred for the coagulation solution to contain a predetermined amount of resorcin, because the coagulation solution can be controlled to have a stable composition. The composition of solvent in the coagulation solution and the temperature of coagulation solution are important conditions for controlling the structure of the polyketone porous film and are appropriately selected by taking into account the combination with the solvent composition. In the case of using an aqueous resorcin solution as the solvent for dissolving the polyketone, methanol or a solvent obtained by mixing water and methanol in an appropriate ratio is preferably used as the coagulation solution. In the case of a mixed solvent of water and methanol, the mixing ratio by mass is preferably water:methanol=from 65:35 to 0:100 in view of constructing the structure of the polyketone porous film of the present invention. In the ratio above, when the ratio of water is 65:35 or less, a dense layer is prevented from being formed near the surface of the obtained polyketone porous film and the pore diameter distribution in the thickness direction can be made uniform. Also, the temperature of the coagulation solution is preferably from −20° C. to 50° C. When the temperature of the coagulation solution is −20° C. or more, the resorcin can be prevented from precipitating in the film during the solidification process and formation of a final pinhole can be avoided. When the temperature of the coagulation temperature is 50° C. or less, the surface or entirety of the film can be prevented from becoming dense. The temperature of the solidification solution is more preferably from 0 to 40° C.

The flat film solidified by the method above is further washed with a solidification solution or the like and, if desired, the solidification solution comprised in the film is replaced by another solvent. The purpose of performing solvent replacement is to increase the drying efficiency at the time of drying the solidified film and prevent the structure of the polyketone porous film from deforming due to shrinkage or the like during drying. From the standpoint of preventing deformation of the structure of polyketone porous film or increasing the porosity, the solvent for replacing the coagulation bath is preferably a solvent having a surface tension lower than that of water and specifically, a lower or higher alcohol solvent such as methanol, ethanol, normal propyl alcohol, isopropyl alcohol, normal butanol and normal octanol, an ether-based solvent such as diethyl ether, tetrahydrofuran and 1,4-dioxane, a ketone-based solvent such as methyl ethyl ketone, a halogen-based solvent such as methylene chloride, chloroform and carbon tetrachloride, and a low-polarity organic solvent such as normal pentane, normal hexane, cyclohexane, normal heptane, normal octane, benzene and toluene are preferred. Also, in the solvent used for solvent replacement, an additive such as surfactant may be comprised, if desired. Furthermore, from the standpoint of obtaining a polyketone porous film having a high porosity, a low-polarity organic solvent such as normal pentane, normal hexane, cyclohexane, normal heptane, normal octane, benzene and toluene is particularly preferred.

In the case where the solidified flat film comprises water, in order to smoothly perform the solvent replacement to a low-polarity solvent, solvent replacement by a solvent such as acetone that is easily mixable with both water and a low-polarity solvent may be previously performed. The solvent for replacing the coagulation solution is preferably a solvent having a small surface tension, and specifically, toluene cyclohexane, normal hexane and the like are preferred. If this solvent contains a solvent having strong polarity, the uniformity of the structure of the polyketone porous film tend to be impaired. Therefore, it is important to increase the number of replacements or elevate the purity of the solvent used for replacement as much as possible. The purity of the solvent used for replacement is preferably 90 mass % or more, more preferably 95 mass % or more, still more preferably 98 mass % or more, and most preferably as close to 100 mass % as possible. Also, in the case of washing the solidified film with water, the polyketone solidified film after water washing is, if desired, preferably treated with warm water at 60 to 200° C. under atmospheric pressure or applied pressure. This treatment is effective in preventing the pore structure from deforming due to shrinkage or the like during drying at the time of drying the solidified film. As for this treatment, the treating method and the need therefor vary depending on the kind or the like of the solvent and coagulation solution but are important conditions for controlling the structure of the polyketone porous film and adjusting it to fall in a predetermined range. In particular, the replacement by normal hexane and the warm water treatment are preferred in terms of increasing the crystallization degree of the polyketone porous film and bringing mechanical strength and thermal stability.

The flat film is dried, for example, by a known drying method such as a method of contacting the film with a heated roll, a method of spraying hot air, or a method of drying the film by non-contact heating with an electrothermal heater, whereby a flat film-shaped polyketone porous film is obtained. The drying temperature is from 15 to 200° C. and is appropriately selected according to the type of the liquid dried. Also, if desired, a chemical agent for preventing generation of static electricity may be added before or after drying or before winding or piling the polyketone porous film.

The flat film-shaped polyketone porous film obtained as above may be stretched, if desired. The stretching may be performed only in one axial direction or may be in two axial directions, but the total stretch ratio is preferably 5 times or less. A stretch ratio of 5 times or less is advantageous in terms of preventing the flat film-shaped polyketone porous from rupture during stretching. The stretching may be performed immediately after coagulating the polyketone dope in the coagulation solution or may be performed, if desired, under heating after the drying of the flat film-shaped polyketone porous film. In the case of performing heat stretching, this is preferably performed at a stretching speed of 0.5 cm/sec or less per 1 cm length. The size of the fibrous texture constituting the pore of the polyketone porous film is as very small as about 1 µm or less, leading to a structure having a high porosity, and therefore, the stretching speed is preferably low. In the case of making the pore of the flat film-shaped polyketone porous film to be a flat pore, stretching in one axial direction is preferably performed to 1.2 to 5 times, or stretching in two axial directions is preferably performed such that the stretch ratio in one axis is 1.2 times or more the stretch ratio in another axis without allowing the total stretch ratio to exceed 5 times.

One example of the production method when the polyketone porous film is a hollow fiber membrane is described below. In the case of a hollow fiber membrane, a polyketone dope having a relatively high viscosity is suited for molding into a hollow shape. From this aspect, the dope viscosity at the molding temperature is preferably from 100 to 5,000 poise. When the dope viscosity is 100 poise or more, thread breakage is less likely to occur during molding of the polyketone hollow fiber membrane and the continuous formation of thread is facilitated. On the other hand, when the dope viscosity is 5,000 poise or less, formation of an inner hollow is easy and this is preferred. The dope viscosity is more preferably from 200 to 4,000 poise, still more preferably from 300 to 2,000 poise. The dope temperature at the extrusion is appropriately adjusted to give the above-described preferred dope viscosity but usually, is preferably from 20 to 90° C. When the dope temperature is 20° C. or more, the thickness of the film can be made uniform by preventing an excessive increase in the dope viscosity and at the same time, precipitation of the solute in the dope can be avoided. Also, when the dope temperature is 90° C. or less, the dope can be prevented from a change in the composition due to evaporation of water in the solvent and the intended structural control is facilitated.

The polyketone hollow fiber membrane can be produced using a spinneret such as double pipe orifice and C-type orifice. FIG. 7 is a schematic view of the spinneret used for forming a hollow fiber membrane as the polyketone porous film in one embodiment of the present invention. In FIG. 7, an example of the cross-sectional structure of a cylindrical double pipe orifice. In the case of using a double pipe orifice 11, it is preferred to discharge the polyketone dope from the outer annular orifice 9 and discharge a liquid or gas into air from the inner circular orifice 10. The material discharged from the inner circular orifice is preferably a gas in view of shape control of the hollow fiber membrane and is preferably a liquid in view of stability of spinning. In the case of discharging a gas from the inner circular orifice, the gas is preferably dry nitrogen. In the case of discharging from the inner circular orifice, from the standpoint of forming a uniform structure in the film thickness direction, the liquid preferably has a composition close to or the same as that of the later-described coagulation solution. Also, from the standpoint of maintaining the shape of hollow part, the liquid or gas flowed from the inner circular orifice is preferably discharged under a pressure of 0.01 MPa or more.

Subsequently, the polyketone is dry or wet precipitated from the polyketone dope extruded into air, whereby a solidified micropore structure is formed. In the case of using an aqueous resorcin solution as the solvent, the polyketone dope having a hollow part filled with a gas or a liquid, which is extruded into air, is immersed in a coagulation solution capable of dissolving resorcin, such as methanol, water or a mixed solvent thereof. As the coagulation solution, the same conditions as those in the case of a flat film are suitably used. The solidified hollow fiber membrane is then subjected to washing and, if desired, solvent replacement or warm water treatment by the same methods as those for the flat film. The drying treatment may or may not be performed and in the case of performing this treatment, drying is performed under the same conditions as those for the flat film.

The polyketone hollow fiber membrane obtained as above may be stretched, if desired. The stretching is performed in one axial direction, and the stretch ratio is preferably 5 times or less. A stretch ratio of 5 times or less is preferred, because the polyketone hollow fiber membrane is not ruptured during stretching. The stretching may be performed immediately after coagulating the polyketone dope in the coagulation solution or may be performed, if desired, under heating after the drying of the polyketone hollow fiber membrane. In the case of performing heat stretching, this is preferably performed at a stretching speed of 0.5 cm/sec or less per 1 cm length. The fibrous texture constituting the pore of the polyketone porous film has as very small a size as about 1 µm or less and is a structure with a high porosity and therefore, the stretching speed is preferably low. In the case of making the pore of the polyketone hollow fiber membrane to be a flat pore, stretching in one axial direction is performed to a stretch of 1.2 to 5 times.

The combining method when combining a polyketone and a nonwoven fabric is not particularly limited but includes a method where in a batch or continuous system, the polyketone porous film and a nonwoven fabric are laid one on another and press-bonded, and a method where these are fused together by heating. Also, there is a method where the polyketone dope is coated on one surface or both surfaces of a nonwoven fabric, subjected to coagulation, washing and, if desired, solvent replacement or warm water treatment by the above-described methods, and then dried.

Furthermore, a method where the polyketone dope is coated on a substrate or a nonwoven fabric and after stacking a nonwoven fabric thereon under an appropriate pressure, the laminate is subjected to coagulation, washing and, if desired, solvent replacement or warm water treatment by the above-described methods, and then dried, may also be used. These methods are preferred, because the polyketone part intrudes inside the nonwoven fabric and the adhesive strength between the polyketone part and the nonwoven fabric is increased. In the case of coating the polyketone dope on one surface of a nonwoven fabric, a dope having a relatively high viscosity is suited for molding, and the dope viscosity at the molding temperature is preferably from 100 to 5,000 poise. When the dope viscosity is 100 poise or more, the dope is kept from excessively intruding inside the nonwoven fabric, and the film thickness in the polyketone part becomes uniform, making it possible to prevent, for example, a pore of more than 70 μm from opening. On the other hand, when the dope viscosity is 5,000 poise or less, the dope can successfully permeate the inside the nonwoven fabric to facilitate combining of the nonwoven fabric and the polyketone and the dope coated state is uniform, as a result, the thickness of the nonwoven fabric-combined polyketone porous film becomes uniform. The dope viscosity is more preferably from 200 to 2,000 poise.

From the standpoint of providing a desired function to the polyketone porous film, in the case of substituting another group for at least one hydrogen atom of the polyketone constituting the polyketone porous film, the method for substitution includes, for example, a method where the polyketone is irradiated with electron beam, γ ray, plasma or the like to generate a radical and thereafter, a reactive monomer having a functional group capable of developing the desired function is added. Examples of the reactive monomer include acrylic acid, methacrylic acid, vinylsulfonic acid and a derivative thereof, allylamine, and p-vinylbenzyltrimethylammonium chloride. The substitution treatment may be performed before molding the polyketone into a porous film or may be performed after molding into a porous film, but in view of moldability, the treatment is preferably performed after molding into a porous film.

Also, in the case of producing a polyketone containing a structure represented by the following chemical formula (3):

[Chem. 9]

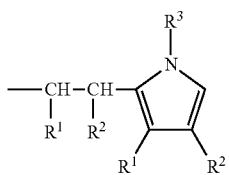

(3)

{wherein each of $R^1$, $R^2$ and $R^3$ is independently a group containing one or more members selected from the group consisting of a hydrogen atom, a halogen atom, an alkyl group having a carbon number of 1 to 20, a hydroxyl group, an ether group, a primary amino group, a secondary amino group, a tertiary amino group, a quaternary ammonium group, a sulfonic acid group, a sulfonic acid ester group, a carboxylic acid group, a carboxylic acid ester group, a phosphoric acid group, a phosphoric acid ester group, a thiol group, a sulfide group, an alkoxysilyl group and a silanol group}, an arbitrary method can be used, but in view of simplicity and ease of production, the polyketone containing the above-described structure is preferably produced by a dehydration condensation reaction of a polyketone and a primary amine. The primary amine includes ethylamine, 1-propylamine, isopropylamine, 1-butylamine, isobutylamine, tert-butylamine, 1-hexylamine, 1-dodecylamine, monoethanolamine, terminal amino group-containing polyethylene glycol, ethylenediamine, propanediamine, N-methylethylenediamine, N-methylpropanediamine, N,N-dimethylethylenediamine, N,N-dimethylpropanediamine, 4-aminopyridine, aminomethanesulfonic acid, aminoethanesulfonic acid, 3-aminobenzenesulfonic acid, sodium 3-aminobenzenesulfonate, sulfanilic acid, sodium sulfanilate, glycine, glycine methyl ester, O-phosphoethanoldiamine, cysteine, cysteamine, methionine, methionine methyl ester, 3-aminopropyltrimethoxysilane, and 3-aminopropyltriethoxysilane. The hydration condensation reaction may be performed before molding the polyketone into a porous film or may be performed after molding into a porous film, but in view of moldability, the reaction is preferably performed after molding into a porous film.

EXAMPLES

The present invention is specifically described below by referring to Examples and Comparative Examples, but the present invention is not limited thereto.

The measured values and measurement methods in Examples and Comparative Examples are as follows.
(1) Intrinsic Viscosity of Polyketone The intrinsic viscosity [η] (unit: dl/g) of the polyketone is a value determined based on the following definitional equation:

$$[\eta] = \lim_{C \to 0}(T-t)/(t \cdot C)[dl/g] \qquad [\text{Math. 2}]$$

{wherein t is the flow time of hexafluoroisopropanol with a purity of 98% or more through the viscosity tube at 25° C., T is the flow time of a dilute solution of polyketone dissolved in hexafluoroisopropanol through the viscosity tube at 25° C., and C is the mass value in gram unit of the solute (i.e., polyketone) in 100 ml of the solution above}.
(2) Average Through Hole Diameter Using a palm porometer (CFP-1200AEX, Porous Materials, Inc.) and using, as an immersion liquid, perfluoropolyester ("Galwick", trade name, surface tension: 15.6 dyn/cm) produced by the same company, the average through hole diameter $d_m$ (μm) was measured by a half dry method in conformity to ASTM E1294-89.
(3) Inner Diameter and Outer Diameter of Hollow Fiber Membrane The cross-section perpendicular to the longitudinal direction of the hollow fiber membrane was photographed at arbitrary 5 portions by an optical microscope, the inner diameter and the outer diameter were measured at arbitrary 2 points in each cross-sectional image, and the average inner diameter r (μm) and the average outer diameter R (μm) of the hollow fiber membrane, which are obtained as the number average value of 10 points in total, were defined as the inner diameter and the outer diameter, respectively.
(4) Film Thickness
In Case of Flat Film:

In a dial gauge (PEACOCK No. 25, manufactured by Ozaki Mfg. Co., Ltd.), the thickness of the polyketone porous film was measured at measurement points selected from 9 portions (3 points×3 points) at intervals of 5 mm in a grid, and the average thickness $L_p$ (μm) obtained as the number average value was taken as the film thickness.

In Case of Hollow Fiber Membrane:

From the average inner diameter r and average outer diameter R determined in (3), the average thickness $L_h$ (μm) of the hollow fiber membrane obtained according to (R−r)/2 was taken as the film thickness.

(5) Porosity

In Case of Flat Film:

A specimen of 5 cm×5 cm was cut out and weighed for the mass G (g). From the average thickness $L_p$ (μm) determined in (4) and the mass average density ρ (g/cm$^3$), the porosity was calculated according to the following calculation formula:

Porosity (%)=$\{1-G/5^2/\rho/(L_p \times 10^{-4})\} \times 100$

{wherein the mass average density ρ is the mass average density calculated from the mass G, the mass density of the polyketone, the mass density of polyester and polypropylene in the fiber constituting the nonwoven fabric, and the basis weight of the nonwoven fabric}. Incidentally, the mass densities of polyketone, polyester and polypropylene were assumed to be 1.3 g/cm$^3$, 1.4 g/cm$^3$ and 0.9 g/cm$^3$, respectively.

In Case of Hollow Fiber Membrane:

Ten specimens having a fiber length of 5 cm were cut out and weighed the total mass G (g). From the average outer diameter R (μm) and average inner diameter r (μm) determined in (3), assuming that the mass density of polyketone is 1.3 g/cm$^3$, the porosity of the hollow fiber membrane was calculated according to the following calculation formula:

Porosity (%)=$[1-G/10/1.3/5/\{(R^2-r^2)-10^{-8} \times \pi/4\}] \times 100$ (6) Pore Diameter Uniformity Parameter The polyketone porous film was encapsulated together with ethanol in a gelatin capsule, the capsule was cooled by the immersion in liquid nitrogen and in the state of ethanol being frozen, separated to prepare a transverse cross-section slice. An image of the obtained slice was photographed at a magnification of 500 to 50,000 times by using an electron microscope. The negative image photographed was measured using an image analyzer (IP1000-PC, manufactured by Asahi Kasei Corp.) by the following method. The negative image was taken in by a black-and-white image with 256 gradations (gamma correction value: 2.2) by using a scanner (JX-330). The take-in area was selected according to the photographing magnification. The taken-in image with 256 gradations was digitized. The parameters set here were (1) threshold (=automatic), (2) shading compensation (=execute), (3) hole filling (=execute), and (4) gamma correction (=correction value γ=2.2). From the digitized image obtained, the resin portion other than polyketone, the pore formed only by the resin, the pore partially deviating from the measuring range, and the hollow portion of hollow fiber membrane were removed by contact with the measuring area and line, and the particle analysis was performed to determine the equivalent-circle diameter of the target pore.

After measuring 5 visual fields while shifting in the thickness direction of the film, the arithmetic mean value and the standard deviation were calculated for the equivalent-circle diameters of all pores measured, and the former and the latter are taken as the average diameter (μm) and the standard deviation (μm) of pore diameter, respectively. The value obtained by dividing the determined standard deviation of pore diameter by the average pore diameter was designated as the pore diameter uniformity parameter.

(7) Air Permeation Resistance

The air permeation resistance was measured in conformity to JIS P8117 (Gurley method).

(8) Hollow Ratio

The hollow ratio was calculated using the average inner diameter r and the average outer diameter R determined in (3), according to the following calculation formula:

Hollow ratio (%)=$(r^2/R^2) \times 100$ (9) Ratio of Fibrous Texture with Size of 0.5 μm or Less A transverse cross-section slice obtained by the method of (6) was used for evaluating the diameter and ratio of the fibrous texture of the polyketone part in an image photographed at 10,000 times by using an electron microscope. After performing digitization by the same method as in (6), a shrinking/separation treatment was further performed at a shrinking frequency of 5 to 10 times to determine the length in main axis direction and the width in main axis direction. The measurement point where the value obtained by dividing the length in main axis direction by the width in main axis direction was less than 1.5, and the measurement point where the length in main axis direction was less than 0.1 μm, were judged as noise and excluded. After performing the measurement above in arbitrary 5 visual fields, the percentage of the number of measurement points where the width in main axis direction is 0.5 μm or less, based on the number of all measurement points was calculated and taken as the ratio (%) of the fibrous texture having a size of 0.5 μm or less to fibrous textures in the polyketone part.

(10) Melting Point and Crystallization Degree of Polyketone

In a nitrogen atmosphere, 5 mg of the polyketone porous film was sealed in an aluminum pan and measured using a differential thermal analyzer, Pyris 1 (trade name), manufactured by Perkin Elmer Inc. under the following conditions.

Sample weight: 5 mg
Atmosphere: nitrogen, flow rate=100 mL/min
Temperature conditions:
(i) kept at 25° C. for 1 minute
(ii) 25° C.→300° C. (temperature rise rate=10° C./min)

The rising temperature of the endothermic peak due to fusion of polyketone in the course of raising the temperature of (ii) was taken as the melting point of the polyketone. Also, the crystallization degree of the polyketone was determined from the size ΔH (J/g) of the endothermic peak above according to the following mathematical expression:

Crystallization degree (%) of polyketone=$\Delta H / \Delta H_0 \times 100$

{$\Delta H_0$ is the melting heat of polyketone (J/g) and the value thereof varies depending on the chemical structure of polyketone; for example, in the case of a polyketone composed of only a 1-oxotrimethylene repeating unit, $\Delta H_0$=225 J/g}.

(11) Tensile Strength

With respect to a sample cut out into a 15 mm-wide strip, the rupture strength was measured at 5 points by using a horizontal tensile strength tester (manufactured by Kumagai Riki Kogyo Co., Ltd.) under the conditions of chuck-to-chuck distance: 80 mm and stretching speed: 80 mm/min, and the number average thereof was taken as the tensile strength (MPa).

(12) Pressure Loss Per Unit Thickness

In Case of Flat Film

The polyketone porous flat film was punched in a circular shape, and the flat film was fixed on a stainless steel-made holder (manufactured by ADVANTEC, effective filtration area: 3.5 cm²). The pressure loss when filtering the whole amount of distilled water at 1.4 mL/min/cm² was measured and divided by the thickness (μm), whereby the pressure loss per unit thickness (kPa/μm) was calculated.

In Case of Hollow Fiber Membrane

A hollow fiber membrane minimodule was produced by bundling n filaments (n is from 5 to 10) of the hollow fiber membrane, embedding both ends with an epoxy resin and cutting it to give an effective filtration length of 5 cm and evaluated. One end of the minimodule was completely sealed, and the pressure loss when filtering the whole amount distilled water at 1.4 mL/min/cm² was measured and divided by the thickness (μm), whereby the pressure loss per unit thickness (kPa/μm) was calculated. Here, the effective filtration area (cm²) was calculated using the average inner diameter r (μm) determined in (3), according to the following formula:

$$\text{Effective filtration area (cm}^2\text{)} = n \times 5 \times \pi \times r \times 10^{-4}$$

(13) Particle Collection Efficiency

In Case of Flat Film

Using the flat film-shaped polyketone porous film as the filter medium, the whole amount of a polystyrene latex water dispersion having a particle diameter $d_p$ (μm) in a relationship of $d_p = d_m \pm 0.1 \times d_m$ with the average though hole diameter $d_m$ (μm) of the porous film and having a particle concentration of 2.0 ppm was filtered at a differential pressure of 100 kPa with an effective filtration area of 3.5 cm² for 5 minutes. The particle concentration C (ppm) of the filtrate was measured, and the particle collection efficiency (%) was calculated according to the following formula:

$$\text{Particle collection efficiency (\%)} = (1 - C/2) \times 100$$

In Case of Hollow Fiber Membrane

A hollow fiber membrane minimodule was produced by bundling n filaments (n is from 5 to 10) of the hollow fiber membrane, embedding both ends with an epoxy resin and cutting it to give an effective filtration length of 5 cm and evaluated. One end of the minimodule was completely sealed, and the whole amount of a polystyrene latex water dispersion under the same conditions as in the case of a flat film was filtered at a differential pressure of 100 kPa for 5 minutes. The particle concentration C (ppm) of the filtrate was measured, and the particle collection efficiency (%) was calculated according to the formula above.

Incidentally, the concentration of polystyrene was measured using an ultraviolet/visible spectrophotometer (V-650, JASCO) after preparing a calibration curve from a polystyrene latex water dispersion with a known concentration.

(14) Withstand Voltage

In Case of Flat Film

The withstand voltage was measured in air at 23° C. in conformity to JIS C2110. The measurement result was divided by the average thickness of the sample measured in (4), and the obtained value was described in terms of a thickness of 1 mm.

In Case of Hollow Fiber Membrane

The evaluation of withstand voltage of the hollow fiber membrane was not performed.

Example 1

A polyketone having an intrinsic viscosity of 3.4 dl/g obtained by complete alternating copolymerization of ethylene and carbon monoxide (abbreviation of polymer structure: ECO) was added to an aqueous 65 mass % resorcin solution at a polymer concentration of 10.7 mass % and dissolved with stirring at 80° C. for 2 hours, and the resulting solution was defoamed to obtain a uniform and transparent dope.

This dope at 50° C. was coated in a sheet form on a glass plate by using an applicator to a dope thickness of 100 μm, and the sheet-like dope was coagulated by immersion in methanol at 25° C. for 10 minutes, then washed with methanol and dried at 60° C. to obtain a flat film-shaped polyketone porous film.

The average through hole diameter of the obtained polyketone porous film was 0.15 μm, the porosity was 35%, and the pore diameter uniformity parameter was 0.3. Also, the film thickness was 25 μm, the ratio of the fibrous texture having a size of 0.5 μm or less in the polyketone part was 86%, the melting point of polyketone was 242° C., the crystallization degree of polyketone was 63%, the air permeation resistance was 49 seconds/100 ml, and the polyketone porous film was uniform, where a large pore giving rise to a defect such as a pinhole was not observed.

The polyketone porous film above was evaluated for the performance as a filtration membrane and a separator of a battery or a capacitor. The pressure loss per unit thickness when the filtration speed of water was 1.4 mL/min/cm² was measured and found to be 1.4 kPa/μm. Also, when a polystyrene latex water dispersion having an average particle diameter of 0.152 μm was filtered for 10 minutes, the particle collection efficiency was 99%. In this way, the polyketone porous film obtained in Example 1 was very excellent as the filter medium. Furthermore, the withstand voltage was measured and found to be 25 kV/1 mm, revealing that the short-circuit resistance required of the separator of a battery or a capacitor was excellent. These results are shown in Table 1.

Example 2

A polyketone porous film was produced under the same conditions as in Example 1 except that after coagulation and washing, solvent substitution was performed with acetone and with normal hexane in this order and the drying temperature was changed to 50° C. The performances of the polyketone porous film of this Example are shown in Table 1.

Example 3

A polyketone porous film was produced under the same conditions as in Example 2 except that as the coagulation solution and washing solvent, an equivalent-mass mixed solution of methanol/water was used in place of methanol. The performances of the polyketone porous film of this Example are shown in Table 1.

Example 4

A polyketone porous film was produced under the same conditions as in Example 3 except that the dope was coated in a sheet form on the glass plate to a dope thickness of 40 μm. The performances of the polyketone porous film of this Example are shown in Table 1.

Example 5

A polyketone porous film was produced under the same conditions as in Example 3 except that the dope was coated in a sheet form on the glass plate to a dope thickness of 500 μm. The performances of the polyketone porous film of this Example are shown in Table 1.

Example 6

A polyketone porous film was produced under the same conditions as in Example 3 except that as the coagulation solution, a mixed solution of methanol/water/resorcin in a mass ratio of 45/45/10 was used in place of the equivalent-mass mixed solution of methanol/water. The performances of the polyketone porous film of this Example are shown in Table 1.

Example 7

A polyketone porous film was produced under the same conditions as in Example 3 except that the polymer concentration was changed to 9.2 mass %. The performances of the polyketone porous film of this Example are shown in Table 1.

Example 8

A polyketone porous film was produced under the same conditions as in Example 3 except that the intrinsic viscosity of polymer was changed to 4.9 dl/g and the polymer concentration was changed to 9.2 mass %. The performances of the polyketone porous film of this Example are shown in Table 1.

Example 9

A polyketone porous film was produced under the same conditions as in Example 3 except that the washing solvent was changed to water and the polyketone film after washing was heat-treated at 150° C. for 1 hour in an autoclave containing water in an amount sufficiently large to completely immerse the polyketone film and then dried at 80° C. without replacing the water with another solvent. The performances of the polyketone porous film of this Example are shown in Table 1.

Example 10

A polyketone porous film was produced by placing a polyketone porous film produced in the same manner as in Example 3 in an electric heating furnace kept at 220° C. for 5 minutes and then performing uniaxial stretching to 2.0 times at a stretching speed of 5 cm/sec. The average of long diameters of pores in the polyketone porous film of this Example was 3.0 µm, the average of short diameters was 0.6 µm, and the ellipticity was 0.80. The performances of the polyketone porous film of this Example are shown in Table 1.

Example 11

A polyketone porous film was produced under the same conditions as in Example 3 except that a polyketone (abbreviation of polymer structure: EPCO) as a ternary copolymer (intrinsic viscosity: 2.0 dl/g) obtained by replacing the 6 mol % portion of ethylene with propylene was used in place of the complete alternating copolymer of ethylene and carbon monoxide and the dope was produced at a polymer concentration of 12 mass %. The performances of the polyketone porous film of this Example are shown in Table 1.

Example 12

A polyketone porous film was produced under the same conditions as in Example 3 except that a polyketone (abbreviation of polymer structure: EStCO) as a ternary copolymer (intrinsic viscosity: 1.8 dl/g) obtained by replacing the 4 mol % portion of ethylene with styrene was used in place of the complete alternating copolymer of ethylene and carbon monoxide and the dope was produced at a polymer concentration of 12 mass %. The performances of the polyketone porous film of this Example are shown in Table 1.

Example 13

A polyketone porous film was produced under the same conditions as in Example 3 except that a polyketone (abbreviation of polymer structure: PCO) as a complete alternating copolymer (intrinsic viscosity: 1.6 dl/g) of propylene and carbon monoxide was used in place of the complete alternating copolymer of ethylene and carbon monoxide and the dope was produced at a polymer concentration of 12 mass %. The performances of the polyketone porous film of this Example are shown in Table 1.

Example 14

A polyketone porous film was produced by the following method using an A/B/A type multilayer nonwoven fabric obtained by thermally press-bonding an unbonded filament web fiber layer (nonwoven fabric layer A) having a basis weight of 17.5 g/m$^2$ and composed of a polyethylene terephthalate fiber having an average fiber diameter of 16 µm on top and bottom of a random web ultrafine fiber layer (nonwoven fabric layer B) having a basis weight of 5 g/m$^2$ and composed of an ultrafine polyethylene terephthalate fiber having an average fiber diameter of 1.6 µm.

A polyketone dope at 50° C. produced under the same conditions as in Example 3 was coated by using an applicator on one surface of the nonwoven fabric to a dope thickness of 35 µm. This polyketone dope/nonwoven fabric composite was coagulated, washed and dried under the same conditions as in Example 3 to obtain a polyester nonwoven fabric composite polyketone porous film. The ratio of the mass of polyketone to the total mass of the polyketone porous film was 11 mass %.

The tensile strength of the polyketone porous film was 28 MPa. Since the tensile strength of the polyketone porous film of Example 3 was 1.3 MPa, the polyketone porous film of this Example was excellent in terms of tensile strength. The porosity, average through hole diameter and pore diameter uniformity parameter of the polyketone porous film of this Example were measured and found to be 48%, 0.21 µm and 0.2, respectively. Using the polyketone porous film of this Example, the pressure loss per unit thickness when the filtration speed of water was 1.4 mL/min/cm$^2$ was measured and found to be 0.20 kPa/µm. Also, when a polystyrene latex water dispersion having an average particle diameter of 0.152 µm was filtered for 10 minutes, the particle collection efficiency was 99%. The performances of the polyketone porous film of this Example are shown in Table 1.

Example 15

A polyketone porous film was produced by the following method using an A/B/A type multilayer nonwoven fabric obtained by thermally press-bonding an unbonded filament web fiber layer (nonwoven fabric layer A) having a basis weight of 8 g/m² and composed of a polypropylene fiber having an average fiber diameter of 11 μm on top and bottom of a random web ultrafine fiber layer (nonwoven fabric layer B) having a basis weight of 1 g/m² and composed of an ultrafine polypropylene fiber having an average fiber diameter of 1.6 μm.

A polyketone dope at 50° C. produced under the same conditions as in Example 3 was coated by using an applicator on one surface of the nonwoven fabric to a dope thickness of 35 μm. This polyketone dope/nonwoven fabric composite was coagulated, washed and dried under the same conditions as in Example 3 to obtain a polypropylene nonwoven fabric composite polyketone porous film. The ratio of the mass of polyketone to the total mass of the polyketone porous film was 19 mass %.

The tensile strength of the polyketone porous film was 18 MPa. The porosity, average through hole diameter and pore diameter uniformity parameter of the polyketone porous film of this Example were measured and found to be 55%, 0.22 μm and 0.2, respectively. Using the polyketone porous film of this Example, the pressure loss per unit thickness when the filtration speed of water was 1.4 mL/min/cm² was measured and found to be 0.12 kPa/μm. Also, when a polystyrene latex water dispersion having an average particle diameter of 0.152 μm was filtered for 10 minutes, the particle collection efficiency was 99%. The performances of the polyketone porous film of this Example are shown in Table 1.

Example 16

A polyketone porous film was produced by the following method using an A/B/A type multilayer nonwoven fabric obtained by thermally press-bonding an unbonded filament web fiber layer (nonwoven fabric layer A) having a basis weight of 3.3 g/m² and composed of a polyester filament having an average fiber diameter of 16 μm on top and bottom of a random web ultrafine fiber layer (nonwoven fabric layer B) having a basis weight of 1.4 g/m² and composed of an ultrafine polyester fiber having an average fiber diameter of 1.6 μm.

A polyketone dope at 50° C. produced under the same conditions as in Example 3 was coated by using an applicator on one surface of the nonwoven fabric to a dope thickness of 25 μm. This polyketone dope/nonwoven fabric composite was coagulated, washed and dried under the same conditions as in Example 3 to obtain a polyester nonwoven fabric composite polyketone porous film. The ratio of the mass of polyketone to the total mass of the polyketone porous film was 33 mass %.

The tensile strength of the polyketone porous film was 17 MPa. The porosity, average through hole diameter and pore diameter uniformity parameter of the polyketone porous film of this Example were measured and found to be 71%, 0.23 μm and 0.2, respectively. Using the polyketone porous film of this Example, the pressure loss per unit thickness when the filtration speed of water was 1.4 mL/min/cm² was measured and found to be 0.10 kPa/μm. Also, when a polystyrene latex water dispersion having an average particle diameter of 0.152 μm was filtered for 10 minutes, the particle collection efficiency was 99%. The performances of the polyketone porous film of this Example are shown in Table 1.

Comparative Example 1

A polyketone obtained by complete alternating copolymerization of ethylene and carbon monoxide and having an intrinsic viscosity of 3.4 dl/g was added to an aqueous 62 mass % metal salt solution of zinc chloride/calcium chloride/lithium chloride in a ratio of 22/30/10 by mass % at a polymer concentration of 8.5 mass %, dissolved by stirring at 60° C. for 5 hours and at 80° C. for 1 hour, and defoamed to obtain a uniform transparent dope.

This dope at 80° C. was coated by using an applicator on a glass plate to a dope thickness of 150 μm, coagulated by immersion in an aqueous 5 mass % metal salt solution of zinc chloride/calcium chloride/lithium chloride in a mass ratio of 22/30/10 at 25° C. for 10 minutes, washed with 0.1 mass % hydrochloric acid, then washed with water, subsequently subjected to solvent replacement with acetone and with normal hexane in this order, and dried at 60° C. to obtain a polyketone porous film in a flat film form.

The average through hole diameter of the obtained polyketone porous film was 0.3 μm, the porosity was 80%, and the pore diameter uniformity parameter was 1.5. Also, the thickness was 47 μm, the ratio of the fibrous texture having a size of 0.5 μm or less in the polyketone part was 19%, the air permeation resistance was 40 seconds/100 ml, and in the polyketone porous film, a large pore giving rise to a defect such as pinhole was not observed.

The polyketone porous film above was evaluated for the performance as a filtration membrane and a separator of a battery or a capacitor. The pressure loss per unit thickness when the filtration speed of water was 1.4 mL/min/cm² was measured and found to be 0.46 kPa/μm. Also, when a polystyrene latex water dispersion having an average particle diameter of 0.294 μm was filtered for 10 minutes, the particle collection efficiency was 60% and thus was a not satisfactory value. Furthermore, the withstand voltage was measured and found to be 18 kV/l mm, revealing that the short-circuit resistance as a separator of a battery or a capacitor was insufficient. These results are shown in Table 1.

Comparative Example 2

A polyketone porous film was produced under the same conditions as in Example 3 except that the washing solvent after coagulation was changed to water and the film was dried at 80° C. without replacing the water with another solvent. These results are shown in Table 1.

Comparative Example 3

To a dope produced under the same conditions as in Example 3, a polystyrene bead of 90 μm (produced by Wako Pure Chemical Industries, Ltd.) was added in a 50 mass % portion of the mass of polyketone and suspended by stirring at 80° C. for 30 minutes to obtain a polyketone dope. The dope at 50° C. was coated by using an applicator on a glass plate to a dope thickness of 300 μm, then coagulated by immersion in an equivalent-mass mixed solution of methanol/water at 25° C. for 10 minutes, washed with water and dried at 80° C. to obtain a polyketone/polystyrene composite film. This composite film was immersed in toluene to completely dissolve and remove the polystyrene component and after replacing the toluene with normal hexane, the film was dried at 50° C. to obtain a polyketone porous film. These results are shown in Table 1.

Comparative Example 4

A polyketone porous film was produced under the same conditions as in Example 3 except that the temperature of the coagulation solution was changed to 60° C. These results are shown in Table 1.

Comparative Example 5

A polyketone porous film was produced under the same conditions as in Example 3 except that the intrinsic viscosity of polymer was changed to 1.5 dl/g, the polymer concentration was changed 15 mass %, the washing solvent after coagulation was changed to water, and the film was dried at 80° C. without replacing the water with another solvent. These results are shown in Table 1.

Comparative Example 6

A polyketone obtained by complete alternating copolymerization of ethylene and carbon monoxide and having an intrinsic viscosity of 3.4 dl/g was added to hexafluoroisopropanol (HFIP) at a polymer concentration of 6.3 mass %, dissolved by stirring at 25° C. for 2 hours, and defoamed to obtain a uniform transparent dope. This dope at 25° C. was coated by using an applicator on a glass plate to a dope thickness of 250 μm. The resulting sheet-like dope was coagulated by immersion in isopropanol at 25° C. for 10 minutes, then washed with isopropanol and dried at 60° C. to obtain a flat film-shaped polyketone porous film. The results of evaluations are shown in Table 1.

Example 17

Using a cylindrical double pipe orifice shown in FIG. 7, the dope prepared in Example 3 was discharged from the outer annular orifice 9 of the double pipe kept at 25° C., and an equivalent-mass mixed solution of methanol/water at 25° C. pressurized to 0.15 MPa was discharged from the inner circular orifice 10 of the double pipe. Incidentally, in this Example, a double pipe orifice having a size of, in FIG. 7, exterior outer diameter D1=0.8 mm, exterior inner diameter D2=0.4 mm and interior outer diameter D3=0.2 mm was used. The dope discharged from the orifice was led, while taking it up at a constant speed, to enter a coagulation solution composed of an equivalent-mass mixed solution of methanol/water at 25° C. through an air gap of 10 mm and form a coagulated yarn. The obtained polyketone coagulated yarn was washed with an equivalent-mass mixed solution of methanol/water and taken-up onto a reel. Subsequently, the coagulated yarn taken-up onto a reel was subjected to replacement with acetone and further to replacement with normal hexane, and dried at 50° C. to obtain a hollow fiber membrane.

The thickness of the obtained hollow fiber membrane was 93 μm, the outer diameter was 623 μm, and the hollow ratio was 49%. Also, the average through hole diameter was 0.15 μm, the porosity was 80%, the pore diameter uniformity parameter was 0.3, and the hollow fiber membrane was uniform, where a large pore giving rise to a defect such as a pinhole was not observed.

The polyketone hollow fiber membrane above was evaluated for the performance as a filtration membrane. The pressure loss per unit thickness when the filtration speed of water was 1.4 mL/min/cm² was measured and found to be 0.63 kPa. Also, when a polystyrene latex water dispersion having an average particle diameter of 0.152 μm was filtered for 10 minutes, the particle collection efficiency was 99%. In this way, the polyketone porous film obtained in Example 1 was very excellent as the filter medium.

Example 18

A polyketone hollow fiber membrane was produced under the same conditions as in Example 17 except that the polymer concentration was changed to 12 mass % and the take-up speed was adjusted. These results are shown in Table 2.

Example 19

A polyketone porous film was produced by placing the polyketone hollow fiber membrane produced in Example 18 in an electric heating furnace kept at 220° C. for 5 minutes and then performing stretching to 2.0 times at a stretching speed of 5 cm/sec to produce a polyketone porous film. These results are shown in Table 2.

Comparative Example 7

Using an orifice consisting of a cylindrical double pipe, the dope prepared in Comparative Example 1 was discharged from the outer annular orifice of the double pipe kept at 80° C., and an aqueous 5 mass % metal salt solution of zinc chloride/calcium chloride/lithium chloride in a mass ratio of 22/30/10 at 25° C. pressurized to 0.15 MPa was discharged from the inner circular orifice of the double pipe. Also in Comparative Example 7, a double pipe orifice having a size of exterior outer diameter D1=0.8 mm, exterior inner diameter D2=0.4 mm and interior outer diameter D3=0.2 mm was used. The dope discharged from the orifice was led while taking it up to enter a coagulation solution composed of an aqueous 5 mass % metal salt solution of zinc chloride/calcium chloride/lithium chloride in a mass ratio of 22/30/10 at 25° C. through an air gap of 10 mm and form a coagulated yarn. The obtained polyketone coagulated yarn was washed with hydrochloric acid, then washed with water and taken-up onto a reel. Subsequently, the coagulated yarn taken-up onto a reel was replaced with acetone and further replaced with normal hexane, and dried at 50° C. The obtained yarn was a hollow fiber membrane having a cylindrical through-void in the center, and the hollow ratio was 44%.

Example 20

The polyketone porous film obtained in Example 3 was irradiated with an electron beam of 200 kGy for several seconds while cooling the film by dry ice to produce a radicalized polyketone porous film. In a nitrogen atmosphere, the radicalized polyketone porous film was immersed in an aqueous 5 mass % vinylbenzyltrimethylammonium chloride solution from which dissolved oxygen was removed by nitrogen bubbling, at 60° C. for 3 hours, then thoroughly washed with water and then with acetone, and dried at 60° C. to obtain a quaternary ammonium-reacted polyketone porous film. The quaternary ammonium-reacted polyketone porous film was very hydrophilic and remained maintaining the original structure and flow rate-pressure loss characteristics. Furthermore, this polyketone porous film had an excellent anion exchangeability.

Example 21

The polyketone porous film obtained in Example 3 was immersed in a 10 mass % glycine methyl ester/acetic acid suspension at 120° C. for 5 minutes. Subsequently, the polyketone porous film was taken out and immersed in an aqueous 1 mass % sodium hydroxide solution at 80° C. for 10 minutes. Furthermore, the polyketone porous film was taken out, then thoroughly washed with water, with methanol and then with acetone, and dried at 60° C. to produce an N-(carboxymethyl)pyrrole component-containing polyketone porous film. This carboxylic acid-added polyketone porous film was very hydrophilic and maintained the original structure and flow rate-pressure loss characteristics. Furthermore, this polyketone porous film had an excellent anion exchangeability.

Example 22

A single-layer laminate lithium ion battery was produced by a general method using, as the separator, the polyketone porous film obtained in each of Examples 2, 3, 14 and 16 and evaluated for initial cycle characteristics and resistance of the separator. For the positive electrode, an electrode obtained by coating a composition of lithium cobaltate/acetylene black/polyvinylidene fluoride=89/5/6 mass % (area: 14 mm×21 mm, thickness: 83 m) on an aluminum foil was used. For the negative electrode, an electrode obtained by coating a composition of mesocarbon microbead/acetylene black/polyvinylidene fluoride=93/2/5 mass % (area: 15 mm×21 mm, thickness: 83 μm) on a copper foil was used. As the electrolytic solution, a solution obtained by dissolving lithium hexafluorophosphate at a concentration of 1 mol/L in a solution of ethylene carbonate/methyl ethyl carbonate=30/70 mass % was used. The evaluation of initial cycle characteristics was performed under the conditions of temperature: 25° C., charge: 0.2 C, 4.2 V, CCCV 8 h, and discharge: 0.2 C, 2.7 V, CC. The results of the charge/discharge capacity and efficiency in the first cycle and the third cycle are shown in Table 3. The charge/discharge efficiency in the third cycle was about 99% in all cases and found to be high. Also, the charge/discharge curve did not show an abnormality such as short-circuit. From these results, it is understood that an excellent lithium ion battery was produced. Subsequently, the alternating-current impedance characteristics were evaluated under the conditions of temperature: 25° C., frequency: from 0.1 to 20,000 Hz, and amplitude: 10 mV. The resistance at 20,000 Hz is shown in Table 3, and a smaller value indicates that the separator has low resistance and is excellent in the output performance. In the case of porous films by polyketone alone of Examples 2 and 3, the value was a small value. In the case of nonwoven fabric-combined polyketone porous films of Examples 14 and 16, the value was smaller in Example 16 using a nonwoven fabric having a small basis weight.

TABLE 1

| | Production Method of Polyketone Porous Film (Flat Film) | | | | | | |
|---|---|---|---|---|---|---|---|
| | Polymer Structure | [η] dl/g | Solvent | Polymer Concentration % | Cast Thickness μm | Coagulation Solution | Temperature of Coagulation Solution ° C. | Replacement |
| Example 1 | ECO | 3.4 | A | 10.7 | 100 | methanol | 25 | methanol |
| Example 2 | ECO | 3.4 | A | 10.7 | 100 | methanol | 25 | acetone → n-hexane |
| Example 3 | ECO | 3.4 | A | 10.7 | 100 | C | 25 | acetone → n-hexane |
| Example 4 | ECO | 3.4 | A | 10.7 | 40 | C | 25 | acetone → n-hexane |
| Example 5 | ECO | 3.4 | A | 10.7 | 500 | C | 25 | acetone → n-hexane |
| Example 6 | ECO | 3.4 | A | 10.7 | 100 | D | 25 | acetone → n-hexane |
| Example 7 | ECO | 3.4 | A | 9.2 | 100 | C | 25 | acetone → n-hexane |
| Example 8 | ECO | 4.9 | A | 9.2 | 100 | C | 25 | acetone → n-hexane |
| Example 9 | ECO | 3.4 | A | 10.7 | 100 | C | 25 | water (150° C.) |
| Example 10 | ECO | 3.4 | A | 10.7 | 100 | C | 25 | acetone → n-hexane |
| Example 11 | EPCO | 2 | A | 12 | 100 | C | 25 | acetone → n-hexane |
| Example 12 | EStCO | 1.8 | A | 12 | 100 | C | 25 | acetone → n-hexane |
| Example 13 | PCO | 1.6 | A | 10.7 | 100 | C | 25 | acetone → n-hexane |
| Example 14 | ECO | 3.4 | A | 10.7 | 35 | C | 25 | acetone → n-hexane |
| Example 15 | ECO | 3.4 | A | 10.7 | 35 | C | 25 | acetone → n-hexane |
| Example 16 | ECO | 3.4 | A | 10.7 | 25 | C | 25 | acetone → n-hexane |
| Comparative Example 1 | ECO | 3.4 | B | 8.5 | 150 | E | 25 | acetone → n-hexane |
| Comparative Example 2 | ECO | 3.4 | A | 10.7 | 100 | C | 25 | water |
| Comparative Example 3 | ECO | 3.4 | A | 12 | 500 | C | 25 | water |
| Comparative Example 4 | ECO | 3.4 | A | 10.7 | 100 | C | 60 | acetone → n-hexane |
| Comparative Example 5 | ECO | 1.5 | A | 15 | 100 | C | 25 | water |
| Comparative Example 6 | ECO | 3.4 | F | 6.3 | 250 | 2-propanol | 25 | 2-propanol |

| | Measured Values | | | | | | | |
|---|---|---|---|---|---|---|---|---|
| | Film Thickness μm | Porosity % | Average Through Hole Diameter μm | Pore Diameter Uniformity Parameter | Ratio of Fibrous Texture of 0.5 μm or less % | Air Permeation Resistance sec | Pressure Loss per Unit Thickness KPa/μm | Particle Collection Efficiency % | Withstand Voltage kV/mm |
| Example 1 | 25 | 35 | 0.15 | 0.3 | 86 | 49 | 1.4 | 99 | 27 |
| Example 2 | 52 | 85 | 0.19 | 0.3 | 88 | 22 | 0.34 | 99 | 26 |
| Example 3 | 50 | 84 | 0.15 | 0.2 | 98 | 20 | 0.61 | 99 | 25 |
| Example 4 | 19 | 84 | 0.16 | 0.3 | 97 | 7 | 0.5 | 99 | 25 |
| Example 5 | 199 | 80 | 0.13 | 0.3 | 93 | 70 | 0.84 | 99 | 25 |

TABLE 1-continued

| | | | | | | | | | |
|---|---|---|---|---|---|---|---|---|---|
| Example 6 | 57 | 86 | 0.2 | 0.3 | 91 | 18 | 0.31 | 99 | 22 |
| Example 7 | 40 | 83 | 0.24 | 0.3 | 93 | 19 | 0.24 | 99 | 21 |
| Example 8 | 49 | 86 | 0.23 | 0.3 | 96 | 18 | 0.25 | 99 | 21 |
| Example 9 | 37 | 79 | 0.1 | 0.4 | 92 | 29 | 1.4 | 99 | 27 |
| Example 10 | 66 | 88 | 0.29 | 0.3 | 98 | 6 | 0.14 | 99 | 20 |
| Example 11 | 26 | 65 | 0.09 | 0.3 | 89 | 18 | 2 | 99 | 22 |
| Example 12 | 25 | 60 | 0.08 | 0.3 | 88 | 19 | 2.9 | 99 | 21 |
| Example 13 | 25 | 62 | 0.17 | 0.3 | 88 | 8 | 0.63 | 99 | 20 |
| Example 14 | 59 | 47 | 0.21 | 0.2 | 98 | 82 | 0.2 | 99 | 25 |
| Example 15 | 45 | 49 | 0.22 | 0.2 | 97 | 6 | 0.12 | 99 | 25 |
| Example 16 | 34 | 72 | 0.23 | 0.2 | 98 | 20 | 0.1 | 99 | 20 |
| Comparative Example 1 | 47 | 80 | 0.3 | 1.5 | 19 | 40 | 0.46 | 60 | 18 |
| Comparative Example 2 | 8 | 8 | 0.005 | 0.3 | 66 | >1000 | not passed | — | 35 |
| Comparative Example 3 | 180 | 65 | 78 | 0.1 | 59 | 0 | <0.10 | 89 | 9 |
| Comparative Example 4 | 24 | 67 | 0.06 | 1.3 | 68 | 800 | 6.6 | 53 | 21 |
| Comparative Example 5 | 11 | 3 | unmeasurable | 0.3 | 6 | >1000 | not passed | — | 45 |
| Comparative Example 6 | 88 | 46 | 0.1 | 2.4 | 7 | >1000 | not passed | — | 32 |

A: A 65 wt % aqueous solution of resorcin
B: A 62 wt % aqueous solution of zinc chloride/calcium chloride/lithium chloride = 22/30/10 wt
C: A mixed solution of methanol/water/resorcin = 50/50 wt
D: A mixed solution of methanol/water/resorcin = 45/45/10 wt
E: A 5 wt % aqueous solution of zinc chloride/calcium chloride/lithium chloride = 22/30/10 wt
F: HFIP (hexafluoroisopropanol)

TABLE 2

Production Method of Polyketone Porous Film (Hollow Fiber)

| | Polymer Structure | [η] dl/g | Solvent | Polymer Concentration % | Exterior Outer/ Exterior Inner/Interior Outer Diameters mm | Coagulation Solution | Temperature of Coagulation Solution ° C. | Replacement |
|---|---|---|---|---|---|---|---|---|
| Example 17 | ECO | 3.4 | A | 10.7 | 0.8/0.4/0.2 | C | 25 | acetone → n-hexane |
| Example 18 | ECO | 3.4 | A | 12 | 0.8/0.4/0.2 | C | 25 | acetone → n-hexane |
| Example 19 | ECO | 3.4 | A | 10.7 | 0.8/0.4/0.2 | C | 25 | acetone → n-hexane |
| Comparative Example 7 | ECO | 3.4 | B | 8.5 | 0.8/0.4/0.2 | E | 25 | acetone → n-hexane |

Measured Value

| | Film Thickness μm | Outer Diameter μm | Hollow Ratio % | Porosity % | Average Through Hole Diameter μm | Pore Diameter Uniformity Parameter | Ratio or Fibrous Texture of 0.5 μm or less % | Pressure Loss per Unit Thickness kPa/μm | Particle Collection Efficiency % |
|---|---|---|---|---|---|---|---|---|---|
| Example 17 | 93 | 623 | 49 | 80 | 0.15 | 0.3 | 96 | 0.63 | 99 |
| Example 18 | 87 | 450 | 38 | 65 | 0.09 | 0.2 | 92 | 2.00 | 99 |
| Examoie 19 | 44 | 230 | 38 | 80 | 0.19 | 0.2 | 95 | 0.40 | 99 |
| Comparative Example 7 | 12 | 425 | 44 | 69 | 0.30 | 1.5 | 13 | 0.18 | 58 |

A: A 65 wt % aqueous solution of resorcin
B: A 62 wt % aqueous solution of zinc chloride/calcium chloride/lithium chloride = 22/30/10 wt
C: A mixed solution of methanol/water/resorcin = 50/50 wt
E: A 5 wt % aqueous solution of zinc chloride/calcium chloride/lithium chloride = 22/30/10 wt

TABLE 3

| | Porous Film Used for Separator | First Cycle | | | Third Cycle | | | AC Impedance (20,000 Hz) Ω |
|---|---|---|---|---|---|---|---|---|
| | | Charge Capacity mAh | Discharge Capacity mAh | Efficiency % | Charge Capacity mAh | Discharge Capacity mAh | Efficiency % | |
| Example 22 | Example 2 | 10.3 | 9.31 | 90.4 | 9.05 | 8.98 | 99.2 | 0.586 |
| | Example 3 | 10.3 | 9.26 | 89.9 | 9.16 | 9.06 | 98.9 | 0.513 |
| | Example 14 | 10.27 | 9.27 | 90.3 | 9.04 | 8.95 | 99 | 2.635 |
| | Example 16 | 10.1 | 9.06 | 89.7 | 9.06 | 9 | 99.3 | 0.95 |

INDUSTRIAL APPLICABILITY

The polyketone porous film of the present invention has high heat resistance and chemical resistance attributed to the polyketone, has a uniform and adequate pore diameter in the thickness direction, has a high porosity in a specific embodiment, and therefore, is useful as a filter medium and a separator for a battery, a capacity and the like. The filter medium is useful as a filtration filter for water treatment, for a membrane bioreactor, for industrial liquid filtration, for deaeration, for removing contamination from gas, for a chemical filter, and for medical use, and the separator is useful as a separator for a lithium ion secondary battery and a separator for a capacitor such as electrolytic capacitor, electrical double layer capacitor and lithium ion capacitor. Furthermore, the polyketone porous film can also be utilized as a developing phase for immunochromatography and a scaffold member for cell culture.

DESCRIPTION OF REFERENCE NUMERALS

1: Polyketone part
2: Polyester fiber part
3: Hollow fiber membrane
4: Cross-section of hollow fiber membrane
5: Void
6: Polyketone part
7: Nonwoven fabric part
8: Composite part
9: Annular orifice
10: Circular orifice
11: Double pipe orifice

The invention claimed is:

1. A polyketone porous film comprising from 10 to 100 mass % of a polyketone as a copolymer of carbon monoxide and one or more olefins, wherein:
said polyketone porous film has a pore formed only by a polyketone, the pore diameter uniformity parameter as a value obtained by dividing the standard deviation of the pore diameter in said pore by an average pore diameter is from 0 to 1.0, and the average through hole diameter of the polyketone porous film is from 0.01 to 50 µm; and
the polyketone porous film has a polyketone part which has a fibrous structure.

2. The polyketone porous film according to claim 1, wherein the porosity of said polyketone porous film is from 5 to 95%.

3. The polyketone porous film according to claim 1, wherein said polyketone contains a repeating unit represented by the following chemical formula (1):

wherein R is a substituted or unsubstituted hydrocarbon group having a carbon number of 2 to 20.

4. The polyketone porous film according to claim 3, wherein
said R contains one or more members selected from the group consisting of a hydrogen atom, a halogen atom, a hydroxyl group, an ether group, a primary amino group, a secondary amino group, a tertiary amino group, a quaternary ammonium group, a sulfonic acid group, a sulfonic acid ester group, a carboxylic acid group, a carboxylic acid ester group, a phosphoric acid group, a phosphoric acid ester group, a thiol group, a sulfide group, an alkoxysilyl group and a silanol group.

5. The polyketone porous film according to claim 3, wherein
relative to repeating units constituting said polyketone, the ratio of a repeating unit that is the repeating unit represented by chemical formula (1) where R contains one or more functional groups selected from the group consisting of a hydroxyl group, an ether group, a primary amino group, a secondary amino group, a tertiary amino group, a quaternary ammonium group, a sulfonic acid group, a sulfonic acid ester group, a carboxylic acid group, a carboxylic acid ester group, a phosphoric acid group, a phosphoric acid ester group, a thiol group, a sulfide group, an alkoxysilyl group and a silanol group is from 0.1 to 30 mol %.

6. The polyketone porous film according to claim 1, wherein the ratio of a 1-oxotrimethylene repeating unit represented by the following chemical formula (2) relative to repeating units constituting said polyketone is 70 mol % or more:

7. The polyketone porous film according to claim 1, wherein said polyketone contains a structure represented by the following chemical formula (3):

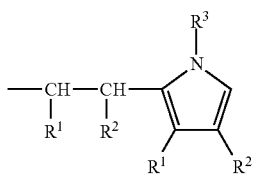

wherein each of $R^1$, $R^2$ and $R^3$ is independently a group containing one or more members selected from the group consisting of a hydrogen atom, a halogen atom, an alkyl group having a carbon number of 1 to 20, a hydroxyl group, an ether group, a primary amino group, a secondary amino group, a tertiary amino group, a quaternary ammonium group, a sulfonic acid group, a sulfonic acid ester group, a carboxylic acid group, a carboxylic acid ester group, a phosphoric acid group, a phosphoric acid ester group, a thiol group, a sulfide group, an alkoxysilyl group and a silanol group in an amount of 30 mass % or less.

8. The polyketone porous film according to claim 7, wherein in chemical formula (3), both $R^1$ and $R^2$ are hydrogen.

9. The polyketone porous film according to claim 1, which has a pore with a long diameter of 0.02 to 20 μm, a short diameter of 0.01 to 5 μm and an ellipticity of 0.5 to 0.95.

10. The polyketone porous film according to claim 1, which is in a flat film form.

11. A lithium secondary battery separator obtained by using the polyketone porous film according to claim 10.

12. A capacitor separator obtained by using the polyketone porous film according to claim 10.

13. The capacitor separator according to claim 12, wherein said capacitor is an electrolytic capacitor, an electrical double layer capacitor or a lithium ion capacitor.

14. A developing phase for immunochromatography, obtained by using the polyketone porous film according to claim 10.

15. A scaffold member for cell culture, obtained by using the polyketone porous film according to claim 10.

16. The polyketone porous film according to claim 1, which is a hollow fiber membrane having one or more voids penetrating in the longitudinal direction.

17. The polyketone porous film according to claim 1, which is a composite comprising said polyketone and at least one nonwoven fabric.

18. The polyketone porous film according to claim 17, wherein said nonwoven fabric is composed of a thermoplastic synthetic fiber and said nonwoven fabric comprises (A) a nonwoven fabric layer having a fiber diameter of 5 to 20 μm and (B) a nonwoven fabric layer having a fiber diameter of 0.5 to 4 μm in a composite integral manner of A/B/A type or A/B type.

19. A filter for filtration, obtained by using the polyketone porous film according to claim 1.

20. The filter for filtration according to claim 19, which is a filter for water treatment, a filter for membrane bioreactor, a filter for industrial liquid filtration, a filter for deaeration, a filter for removing contamination from gas, a filter for chemical filter, or a medical filter.

21. A polyketone porous film according to claim 1 wherein in the fibrous structure a ratio of the number of fibrous materials having a size of 0.5 microns or less to the total number of fibrous materials is 70% or less.

* * * * *